(12) United States Patent
Zhu et al.

(10) Patent No.: US 12,348,309 B2
(45) Date of Patent: Jul. 1, 2025

(54) DATA PROCESSING METHOD AND APPARATUS

(71) Applicant: HUAWEI TECHNOLOGIES CO., LTD., Guangdong (CN)

(72) Inventors: Huiying Zhu, Shanghai (CN); Pengpeng Dong, Shanghai (CN); Zhiyuan Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/896,145

(22) Filed: Aug. 26, 2022

(65) Prior Publication Data

US 2022/0416934 A1    Dec. 29, 2022

Related U.S. Application Data

(63) Continuation of application No. PCT/CN2020/137648, filed on Dec. 18, 2020.

(30) Foreign Application Priority Data

Feb. 28, 2020  (CN) .......................... 202010129066.6

(51) Int. Cl.
*H04L 1/00*    (2006.01)

(52) U.S. Cl.
CPC .......... *H04L 1/0011* (2013.01); *H04L 1/0041* (2013.01); *H04L 1/0075* (2013.01); *H04L 1/0076* (2013.01)

(58) Field of Classification Search
CPC ... H04L 1/0011; H04L 1/0041; H04L 1/0075; H04L 1/0076
See application file for complete search history.

(56) References Cited

U.S. PATENT DOCUMENTS

| | | | |
|---|---|---|---|
| 9,854,458 B2 * | 12/2017 | Zhang | ................... H04W 24/02 |
| 2003/0112824 A1 | 6/2003 | Acosta | |
| 2013/0229968 A1 * | 9/2013 | Zainaldin | .............. H04L 1/1896 |
| | | | 370/312 |
| 2014/0269485 A1 | 9/2014 | Medard et al. | |
| 2014/0269503 A1 | 9/2014 | Medard et al. | |
| 2018/0359050 A1 * | 12/2018 | Lauridsen | ............. H04L 1/0011 |
| 2019/0215727 A1 | 7/2019 | Turtinen et al. | |

FOREIGN PATENT DOCUMENTS

| | | |
|---|---|---|
| CN | 101621353 A | 1/2010 |
| CN | 107276727 A | 10/2017 |
| WO | 2017069845 A1 | 4/2017 |

OTHER PUBLICATIONS

Intel Corporation, AT&T, Deutsche Telekom, Use cases and options for network coding in IAB. 3GPP TSG RAN Meeting #86 , Stiges, Spain, Dec. 9-12, 2019, RP-193077, 8 pages.

(Continued)

*Primary Examiner* — Chandrahas B Patel

(57) ABSTRACT

Embodiments of this application provide a data processing method and apparatus, and relate to the communication field, to improve spectral efficiency in network coding-based data transmission. The method includes a transmit end device generating a protocol data unit (PDU) based on a reference size and K network coded packets, generating a transport block (TB) based on the PDU, and outputting the TB.

14 Claims, 18 Drawing Sheets

(56) References Cited

OTHER PUBLICATIONS

Intel Corporation, AT&T, Use cases and options for network coding in IAB. 3GPP TSG RAN Meeting #86, Sitges, Spain, Dec. 9-12, 2019, RP-192535, 8 pages.
International Search Report and Written Opinion issued in PCT/CN2020/137648, dated Mar. 17, 2021, 9 pages.
Pol Torres Compta et al: "Network coding is the 5G Key Enabling Technology: effects and strategies to manage heterogeneous packet lengths", Jan. 10, 2015, pp. 46-55, XP055318494.
European Patent Office Supplementary European Search Report for Application No. 20821222.4 dated Jun. 19, 2023, 16 pages.
Extended European Search Report for Application No. 20921222 dated Aug. 24, 2023, 19 pages.

* cited by examiner

DATA PROCESSING METHOD AND APPARATUS

CROSS-REFERENCE TO RELATED APPLICATION

This application is a continuation of International Application No. PCT/CN2020/137648, filed on Dec. 18, 2020, which claims priority to Chinese Patent Application No. 202010129066.6, filed on Feb. 28, 2020. The disclosures of the aforementioned applications are hereby incorporated by reference in their entireties.

TECHNICAL FIELD

This application relates to the communication field, and in particular, to a data processing method and apparatus.

BACKGROUND

A random linear network coding (RLNC) technology provides a transmission mechanism that considers both a delay and spectral efficiency. In the RLNC technology, a transmit end codes a plurality of original data units to obtain a plurality of coded data units, and then the transmit end generates a plurality of coded packets. Each coded packet includes one coded data unit and a coding coefficient. A receive end may decode the coded data unit based on the coding coefficient, to obtain the original data unit.

However, when the RLNC technology is applied to actual transmission, if processing is performed based on a data processing procedure of each protocol layer in an existing protocol, a case in which some bits of a coded packet are correctly transmitted but decoding cannot be performed by using the correctly transmitted bits because a coding coefficient of the coded packet is not determined may occur due to segmenting of the coded packet. Consequently, spectral efficiency is reduced.

Therefore, how to improve spectral efficiency in network coding-based data transmission is an urgent problem to be resolved currently.

SUMMARY

Embodiments of this application provide a data processing method and apparatus, to improve spectral efficiency in network coding-based data transmission.

To achieve the foregoing objective, the following technical solutions are used in embodiments of this application.

According to a first aspect, an embodiment of this application provides a data processing method. The method may be performed by a transmit end device (for example, a terminal or a network device), or may be performed by a component of the transmit end device, for example, a processor, a chip, or a chip system of the transmit end device (for example, the terminal or the network device). The method includes: generating a protocol data unit (PDU) based on a reference size and K network coded packets; generating a transport block (TB) based on the PDU; and outputting the TB, where K is a positive integer, and the reference size is a size of a reference TB or a size of a reference PDU.

According to the method provided in the first aspect, the transmit end device may generate the TB based on the size of the reference TB or the reference PDU, so that the TB can include an integer quantity of network coded packets. This reduces cases in which some bits of a network coded packet are correctly transmitted but decoding cannot be performed by using the bits because a coding coefficient of the network coded packet is not determined, and improves spectral efficiency.

With reference to the first aspect, in a possible implementation, the generating a PDU based on a reference size and K network coded packets includes: obtaining the K network coded packets based on the reference size; and generating the PDU based on the K network coded packets. Based on this possible implementation, the transmit end device may flexibly obtain the integer quantity of network coded packets based on the size of the reference TB or the reference PDU, so that data processing flexibility can be improved.

With reference to any one of the first aspect or the possible implementations of the first aspect, in a possible implementation, the generating the PDU based on the K network coded packets includes: segmenting the last network coded packet in the K network coded packets to obtain a plurality of network coded packet segments, where a first network coded packet segment includes header information of the last network coded packet, the first network coded packet segment includes the first N network coded packet segments in the plurality of network coded packet segments, and N is a positive integer; and generating the PDU based on the first K−1 network coded packets and the first network coded packet segment in the K network coded packets.

Based on this possible implementation, because the first network coded packet segment includes the header information of the last network coded packet, the PDU generated based on the first K−1 network coded packets and the first network coded packet segment includes header information of a network coded packet to which the first network coded packet segment belongs, so that a receive end device can perform, based on the header information, decoding by using the first network coded packet segment. Therefore, spectral efficiency is improved.

With reference to any one of the first aspect or the possible implementations of the first aspect, in a possible implementation, header information of a first network coded packet includes information used to indicate a coding coefficient of the last network coded packet. The first network coded packet is a network coded packet in the first K−1 network coded packets.

Based on this possible implementation, when the first network coded packet is correctly transmitted, the receive end device can perform, based on the information used to indicate the coding coefficient of the last network coded packet, decoding by using a network coded packet segment other than the first network coded packet segment in the plurality of network coded packet segments. Therefore, spectral efficiency is improved.

With reference to any one of the first aspect or the possible implementations of the first aspect, in a possible implementation, the data processing method further includes: adding segment header information of a second network coded packet segment. The second network coded packet segment is a network coded packet segment other than the first network coded packet segment in the plurality of network coded packet segments. The segment header information includes the information used to indicate the coding coefficient of the last network coded packet.

Based on this possible implementation, when the second network coded packet segment is correctly transmitted in subsequent transmission, the receive end device can perform, based on the segment header information of the second network coded packet segment, decoding by using the second network coded packet segment. Therefore, spectral efficiency is improved.

With reference to any one of the first aspect or the possible implementations of the first aspect, in a possible implementation, the segment header information further includes information used to indicate an identifier of a network coded block to which the last network coded packet belongs. Based on this possible implementation, the receive end device can store the network coded packet/segment based on the identifier of the network coded block, to facilitate subsequent decoding and reduce a processing delay.

With reference to any one of the first aspect or the possible implementations of the first aspect, in a possible implementation, the data processing method further includes: receiving request information, where the request information is used to request first header information, the first header information includes header information of a second network coded packet and/or segment header information of a third network coded packet segment, the second network coded packet is a network coded packet in the K network coded packets, and the third network coded packet segment is a segment of the last network coded packet in the K network coded packets; and sending, based on the request information, information used to indicate the first header information.

Based on this possible implementation, when the header information of the network coded packet or the segment header information of the network coded packet segment is not correctly transmitted, the receive end device may request the transmit end device to retransmit the header information or the segment header information, without retransmitting a data part of the network coded packet or the network coded packet segment, to reduce resource overheads.

With reference to any one of the first aspect or the possible implementations of the first aspect, in a possible implementation, a total size of the first K−1 network coded packets in the K network coded packets is less than the reference size, and a total size of the K network coded packets is greater than or equal to the reference size. Based on this possible implementation, because the total size of the K network coded packets used to generate the PDU is greater than or equal to the reference size, a size of the generated PDU may be greater than the size of the reference PDU, so that a code rate can be increased.

With reference to any one of the first aspect or the possible implementations of the first aspect, in a possible implementation, a total size of the K network coded packets is less than or equal to the reference size, and a total size of the K network coded packets and a third network coded packet is greater than the reference size. The third network coded packet is a network coded packet other than the K network coded packets. Based on this possible implementation, because the total size of the K network coded packets used to generate the PDU is less than or equal to the reference size, the size of the generated PDU may be less than the size of the reference PDU, so that the code rate can be reduced.

With reference to any one of the first aspect or the possible implementations of the first aspect, in a possible implementation, a size of the TB is different from the size of the reference TB. Based on this possible implementation, because the size of the actually generated TB may be different from the size of the reference TB, the transmit end device does not need to generate the TB based on the size of the reference TB, so that data processing flexibility can be improved.

With reference to any one of the first aspect or the possible implementations of the first aspect, in a possible implementation, a size of the PDU is different from the size of the reference PDU. Based on this possible implementation, because the size of the actually generated PDU may be different from the size of the reference PDU, the transmit end device does not need to generate the PDU based on the size of the reference PDU, so that data processing flexibility can be improved.

With reference to any one of the first aspect or the possible implementations of the first aspect, in a possible implementation, the PDU is one of the following PDUs: a media access control MAC layer PDU, a radio link control RLC layer PDU, a backhaul adaptation protocol BAP layer PDU, a packet data convergence protocol (PDCP) layer PDU, or a PDU of a protocol layer having a network coding function.

With reference to any one of the first aspect or the possible implementations of the first aspect, in a possible implementation, the data processing method further includes: determining, based on a PDU of a second protocol layer and with reference to a network coding parameter and/or a preset rule, a plurality of original data units included in a network coded block. The network coding parameter may include a size of the original data unit included in the network coded block and/or a quantity of original data units included in the network coded block. The preset rule may include: One PDU of the second protocol layer is used as one original data unit; or P PDUs of the second protocol layer are used as M original data units, where P is a positive integer, and M is a positive integer greater than or equal to 2.

With reference to any one of the first aspect or the possible implementations of the first aspect, in a possible implementation, the generating the PDU based on the K network coded packets includes: using a $k^{th}$ network coded packet in the K network coded packets as a $k^{th}$ PDU, where header information of the $k^{th}$ network coded packet is used as a protocol header of the $k^{th}$ PDU, and k is a positive integer from 1 to K; or using a $k^{th}$ network coded packet in the K network coded packets as a payload of a $k^{th}$ PDU, and adding a protocol header of the $k^{th}$ PDU.

With reference to any one of the first aspect or the possible implementations of the first aspect, in a possible implementation, the generating the PDU based on the K network coded packets includes: concatenating the K network coded packets to obtain the PDU. The PDU includes at least K protocol subheaders. The header information of the $k^{th}$ network coded packet in the K network coded packets is located in a $k^{th}$ protocol subheader of the PDU, where k is a positive integer from 1 to K. The first field after the $k^{th}$ protocol subheader of the PDU is padded with a network coded unit of the $k^{th}$ network coded packet. Alternatively, the K protocol subheaders of the PDU are sequentially arranged to form a protocol header of the PDU. Alternatively, the K protocol subheaders of the PDU are sequentially arranged, and the PDU further includes a $(K+1)^{th}$ protocol subheader. Information in the $(K+1)^{th}$ protocol subheader is used to indicate one or more of the following: a quantity of network coded units included in the PDU, the size of the PDU, and a size of a field other than the protocol header in the PDU.

With reference to any one of the first aspect or the possible implementations of the first aspect, in a possible implementation, the generating the PDU based on the K network coded packets includes: concatenating the K network coded packets to obtain the PDU. The K network coded packets are used as payloads of the PDU. The PDU includes a protocol header.

According to a second aspect, an embodiment of this application provides a communication apparatus, to implement the method according to any one of the first aspect or the possible implementations of the first aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a third aspect, an embodiment of this application provides a communication apparatus, including a processor. The processor is coupled to a memory. The memory is configured to store a program or instructions. When the program or the instructions are executed by the processor, the apparatus is enabled to implement the method according to any one of the first aspect or the possible implementations of the first aspect.

According to a fourth aspect, an embodiment of this application provides a communication apparatus. The apparatus is configured to implement the method according to any one of the first aspect or the possible implementations of the first aspect.

According to a fifth aspect, an embodiment of this application provides a computer-readable medium. The computer-readable medium stores a computer program or instructions. When the computer program or the instructions are executed, a computer is enabled to perform the method according to any one of the first aspect or the possible implementations of the first aspect.

According to a sixth aspect, an embodiment of this application provides a computer program product. The computer program product includes computer program code. When the computer program code is run on a computer, the computer is enabled to perform the method according to any one of the first aspect or the possible implementations of the first aspect.

According to a seventh aspect, an embodiment of this application provides a chip, including a processor. The processor is coupled to a memory. The memory is configured to store a program or instructions. When the program or the instructions are executed by the processor, the chip is enabled to implement the method according to any one of the first aspect or the possible implementations of the first aspect.

It may be understood that any communication apparatus, chip, computer-readable medium, computer program product, communication system, or the like provided above is configured to perform the corresponding method provided above. Therefore, for beneficial effects that can be achieved by the communication apparatus, the chip, the computer-readable medium, the computer program product, the communication system, or the like, refer to beneficial effects in the corresponding method.

DESCRIPTION OF EMBODIMENTS

Figure 1:
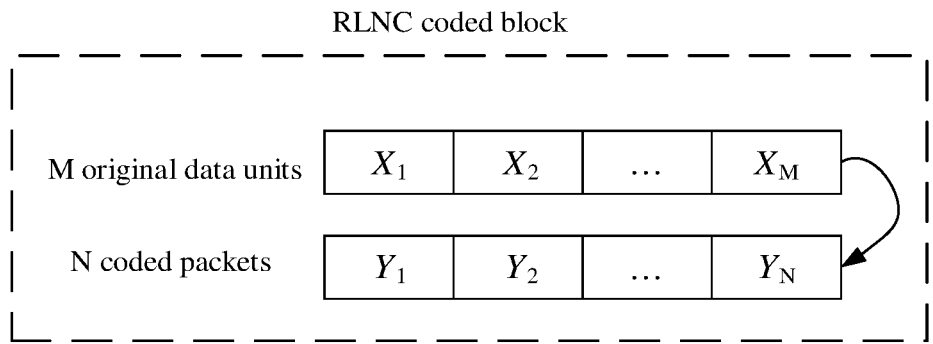
FIG. 1 is a schematic diagram of a principle of RLNC coding.

For ease of understanding technical solutions in embodiments of this application, the following first briefly describes technologies or terms related to this application.
First, Retransmission Mechanism:
The following two types of retransmission mechanisms are introduced in a long term evolution (LTE) or new radio (NR) system to ensure service reliability:
1. Request Retransmission Mechanism Based on Feedback Information The mechanism includes a hybrid automatic repeat request (HARQ) mechanism of a media access control (MAC) layer and an automatic repeat request (ARQ) mechanism of a radio link control (RLC) layer.

The HARQ mechanism exists at both a transmit end and a receive end. HARQ operations at the transmit end include transmitting and retransmitting a transport block (TB), and receiving and processing acknowledgment (ACK) information or negative acknowledgment (NACK) information. HARQ operations at the receive end include receiving the TB, performing soft combination processing, and generating and feeding back ACK/NACK information. After receiving one TB sent by the transmit end, the receive end performs cyclic redundancy check (CRC) on the TB. If CRC check succeeds, the receive end feeds back positive acknowledgment (ACK) to the transmit end. If CRC check fails, the receive end feeds back negative acknowledgment (NACK). If receiving the ACK information, the transmit end performs new transmission. If receiving the NACK information, the transmit end performs retransmission.

The ARQ mechanism is a function in an acknowledged mode (AM) at the RLC layer. ARQ operations at the transmit end include transmitting and retransmitting a protocol data unit (PDU) or segment, receiving a state report from the receive end, receiving a HARQ sending failure indication from a lower layer, and the like. ARQ operations at the receive end include detecting whether an RLC layer PDU fails to be received, feeding back a data reception state to the transmit end by using an RLC layer state report, and the like. The state report may include a serial number (SN) of the RLC layer PDU that has been received by the receive end and an SN of the RLC layer PDU that is not received by the receive end. When detecting a packet loss, the receive end notifies, by using the RLC layer state report, the transmit end that a PDU, a segmented PDU, or a re-segmented PDU is not received, and the receive end requests the transmit end to retransmit the PDU. A relationship between the HARQ mechanism of the MAC layer and the ARQ mechanism of the RLC layer is as follows: After HARQ retransmission reaches a maximum quantity of retransmission times but still fails, ARQ retransmission is performed.

2. Retransmission Mechanism that does not Require Feedback Information

The retransmission mechanism may be understood as blind retransmission. In the retransmission mechanism, when a transmit end does not receive HARQ feedback information from a receive end, or when the receive end does not support a HARQ feedback mechanism, the transmit end repeatedly sends data to the receive end. For example, a sidelink (SL) standard of a vehicle to everything (V2X) in an NR system supports blind retransmission of a TB. In a resource allocation mode 2 of the SL standard, at least an SL resource may be reserved for such blind retransmission.

Second, Random Linear Network Coding (RLNC):

Due to limitations of an air interface transmission delay, a data processing delay of a receive end, and a feedback opportunity, a delay of a feedback-based retransmission mechanism is large, for example, round-trip time (RTT) of uplink HARQ processing for one time in a frequency-division duplex (FDD) system is eight transmission time intervals (TTIs). In blind retransmission, retransmission does not need to be performed based on feedback information. Although a delay can be reduced, a resource is occupied for retransmission regardless of whether initially transmitted data is correct. Consequently, spectral efficiency is low.

An RLNC technology provides a transmission mechanism that considers both performance of a delay and spectral efficiency. A basic principle of RLNC-based network coding is shown in FIG. 1.

A transmit end divides, into a plurality of RLNC coded blocks, a data packet that needs to be sent. Each RLNC coded block includes M original data units, which are respectively represented by $X_1, X_2, \ldots, X_M$. Then, the M original data units are coded to obtain N (N≥M) coded packets. For example, the N coded packets may satisfy a formula $Y_i = \Sigma_{m=1}^{M} g_{i,m} \times X_m$, and the N coded packets may be represented by $Y_1, Y_2, \ldots, Y_N$, where $Y_i$ represents an $i^{th}$ coded packet, $X_m$ represents an $m^{th}$ original data unit, $g_{i,m}$ represents a random coefficient of the $m^{th}$ original data unit in the $i^{th}$ coded packet, and $g_{i,m}$ may be randomly selected from a finite field or a Galois field (GF). The GF field is a field including a finite quantity of elements, and GF(q) may be used to represent a GF field including q elements. In addition, a header of each coded packet $Y_i$ carries a coding coefficient vector used for generating the coded packet. A length of the coding coefficient vector is the same as the quantity M of the original data units in the coded block.

The transmit end sends the N (N≥M) coded packets to the receive end for each RLNC coded block. If a quantity of coded packets received by the receive end is not less than a quantity of original data units in the coded block, and a rank of a matrix including the coding coefficient vector carried in the header of the received coded packet is the quantity of original data units (that is, the receive end receives M linearly independent coded packets), the receive end may decode the coded packets to obtain the M original data units. For example, the receive end may construct a system of linear equations based on the coding coefficient. In the system of linear equations: $X_m$, $m \in \{1, 2, \ldots M\}$, that is, M unknowns to be solved. Then, the M original data units may be obtained by decoding the coded packets by using a linear equation theory.

For example, if the foregoing N coded packets $Y_1, Y_2, \ldots, Y_N$ are all correctly received, the receive end may combine received N coding coefficient vectors together to form a system of linear equations with M unknowns $X_1, X_2, \ldots, X_M$. A coefficient matrix of the equations may be shown as follows, where $[g_{i,1}, g_{i,2}, \ldots, g_{i,M}]$ is a coding coefficient vector of the $i^{th}$ coded packet.

$$\begin{bmatrix} g_{1,1} & g_{1,2} & \cdots & g_{1,M} \\ g_{2,1} & g_{2,2} & \cdots & g_{2,M} \\ \vdots & \vdots & \ddots & \vdots \\ g_{N,1} & g_{N,2} & \cdots & g_{N,M} \end{bmatrix}$$

In a radio channel environment, a factor such as channel noise, mobility fading, or user interference may cause errors in some coded packets received by the receive end. However, for a coded block, a quantity L of correctly received coded packets is not less than the quantity M of the original data units in the coded block. In addition, when a rank of a matrix including coding coefficient vectors carried in headers of the L coded packets is M, the receive end may still decode the coded packets to obtain the M original data units. Therefore, for the RLNC technology, the transmit end does not need to wait for a feedback request of the receive end before retransmission, and the transmit end may send several coded packets in advance to resist impact of a radio channel, to reduce a delay. In addition, there is no need to consume a multiple of resources to perform blind retransmission on each TB, so that a spectrum resource waste is avoided.

Third, Protocol Layer Data Processing Procedure

A data processing procedure of each protocol layer in a communication system (for example, an NR system) is as follows. After determining a size of a physical resource, a MAC layer of a transmit end determines a size of a TB or a size of an RLC layer PDU based on the size of the physical resource and channel state information, and notifies an RLC layer of the size of the TB or the size of the RLC layer PDU. The RLC layer sends the RLC layer PDU to the MAC layer based on the size of the TB or the size of the RLC layer PDU. When the RLC layer cannot completely send, to the MAC layer based on the size of the TB or the size of the RLC layer PDU, each to-be-sent RLC layer service data unit (SDU) at a current transmission opportunity, the RLC layer performs a segmentation operation on the last to-be-sent RLC layer SDU at the current transmission opportunity. Then, the RLC layer generates an RLC layer PDU, and sends the RLC layer PDU to the MAC layer. The MAC layer concatenates PDUs that are from the RLC layer to generate a TB, and sends the TB to a physical (PHY) layer for processing.

The technical solutions in embodiments of this application may be applied to various communication systems. For example, the communication system may be a long term evolution (LTE) system, a $5^{th}$ generation (5G) communication system, an NR system, a wireless-fidelity (Wi-Fi) system, a communication system related to the $3^{rd}$ generation partnership project (3GPP), a future evolved communication system, or the like. This is not limited. Terms "system" and "network" can be interchanged with each other. The 5G communication system is a next generation communication system under research. The 5G communication system includes a non-standalone (NSA) 5G mobile communication system and a standalone (SA) 5G mobile communication system. In addition, the communication system may be further applied to a future-oriented communication technology, and are all applicable to the technical solutions provided in embodiments of this application. The foregoing communication system applicable to this application is only an example for descriptions, and a communication system applicable to this application is not limited thereto. This is uniformly described herein.

Figure 2A:
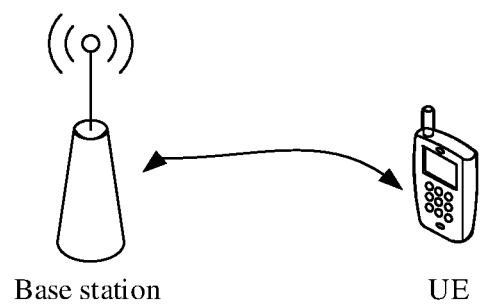
FIG. 2a to FIG. 2d each are a schematic diagram of a scenario of a data processing method according to an embodiment of this application.
Figure 2B:
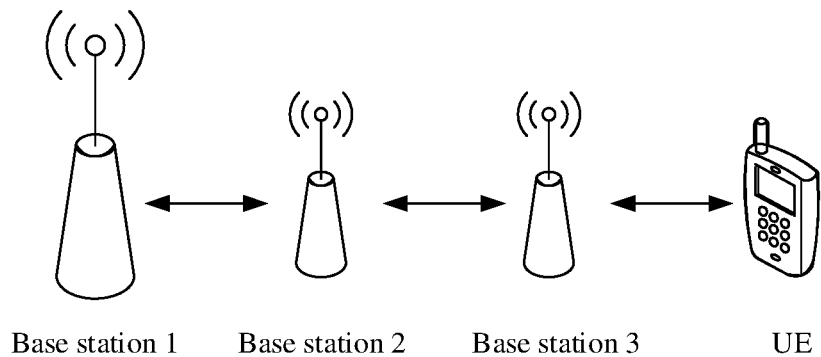
Figure 2C:
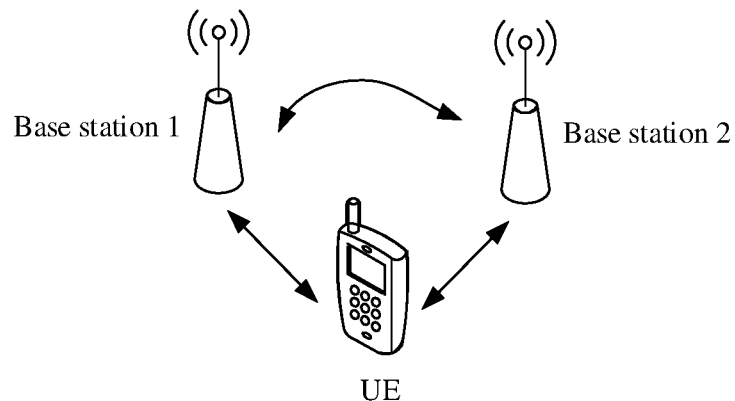
Figure 2D:
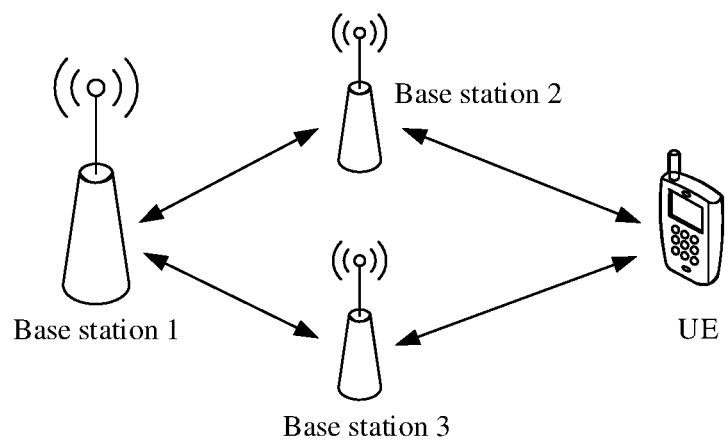

The technical solutions in embodiments of this application may be applied to various mobile communication scenarios, including but not limited to: a point-to-point single connectivity scenario, for example, point-to-point transmission between user equipment (UE) and UE, or point-to-point transmission between a base station and UE shown in FIG. 2a; a multi-hop single connectivity scenario, for example, multi-hop/relay transmission between a base station and UE shown in FIG. 2b; a dual connectivity (DC) scenario, for example, dual connectivity transmission between two base stations and UE shown in FIG. 2c; and a multi-hop multi-connectivity scenario, for example, multi-hop multi-connectivity transmission between a plurality of base stations and UE shown in FIG. 2d.

It may be understood that the foregoing application scenarios of this application are only described as examples, and do not impose any limitation on a network architecture applicable to this application. In addition, transmission is not limited to uplink transmission, downlink transmission, access link transmission, backhaul link transmission, or sidelink link transmission in this application.

Figure 3:
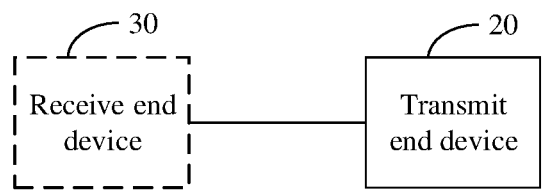
FIG. 3 is a schematic diagram of an architecture of a communication system according to an embodiment of this application.

The following uses only a communication system shown in FIG. 3 as an example to describe the method provided in embodiments of this application. FIG. 3 shows a communication system according to an embodiment of this application. The communication system includes a transmit end device 20. Optionally, the communication system may further include a receive end device 30.

Optionally, the transmit end device 20 and the receive end device 30 in this embodiment of this application may be devices of a same type. For example, both the transmit end device 20 and the receive end device 30 are terminal devices. Alternatively, the transmit end device 20 and the receive end device 30 may be devices of different types. For example, the transmit end device 20 is a terminal device and the receive end device 30 is a network device; or the transmit end device 20 is a network device and the receive end device 30 is a terminal device. This is not specifically limited in this embodiment of this application.

Optionally, the terminal device in embodiments of this application may be a device configured to implement a wireless communication function, for example, a terminal or a chip that may be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The terminal may be mobile or fixed.

Optionally, the network device in embodiments of this application is a device that connects a terminal device to a wireless network, and may be an evolved NodeB (eNB or eNodeB) or a next generation evolved NodeB (ng-eNB) in long term evolution (LTE); or a next generation NodeB (gNB), a broadband network gateway (BNG), an aggregation switch, a non-$3^{rd}$ generation partnership project (3GPP) access device, or the like in a $5^{th}$ generation (5G) network or a future evolved PLMN. This is not specifically limited in embodiments of this application. Optionally, a base station in embodiments of this application may include base stations in various forms, for example, a macro base station, a micro base station (which is also referred to as a small cell), a relay station, and an access point. This is not specifically limited in embodiments of this application.

The communication system shown in FIG. 3 is only used as an example, but is not intended to limit the technical solutions in this application. A person skilled in the art should understand that, in a specific implementation process, the communication system may further include another device. This is not limited.

Figure 4:
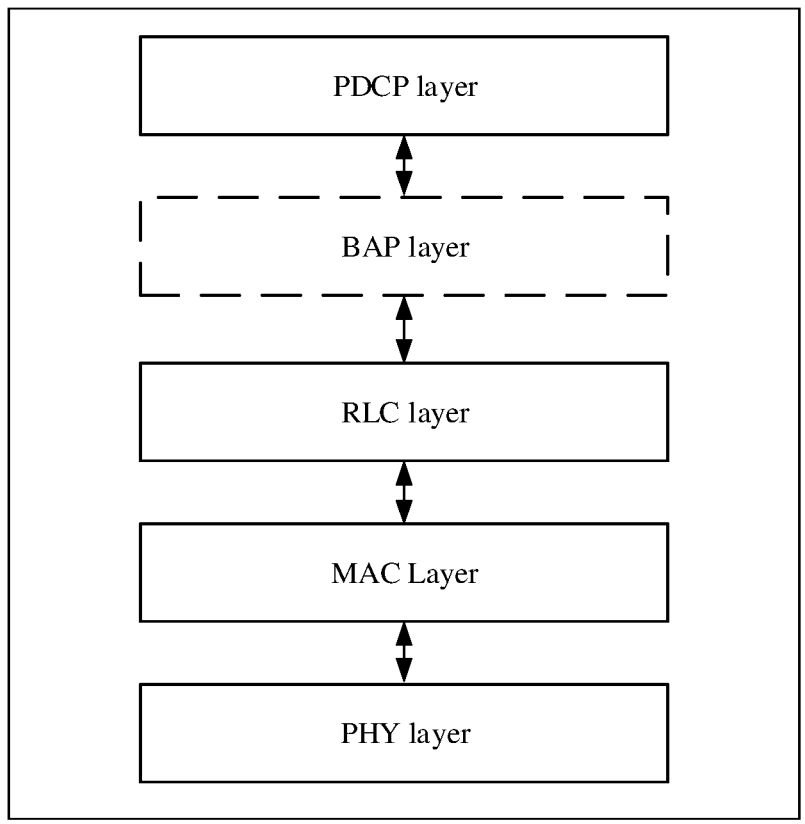
FIG. 4 is a schematic diagram of an architecture of a protocol stack of a transmit end device according to an embodiment of this application.

Optionally, a structure of a protocol stack of the transmit end device 20 or the receive end device 30 in this embodiment of this application is shown in FIG. 4, and sequentially includes a physical layer, a MAC layer, an RLC layer, and a packet data convergence protocol (PDCP) layer from bottom to top. Optionally, the protocol stack may further include a backhaul adaptation protocol (BAP) layer. The physical layer is mainly used for telecommunication physical layer functions, such as modulation, demodulation, and multiple-antenna mapping. The MAC layer is mainly used for uplink and downlink scheduling and HARQ retransmission. The RLC layer is mainly used for segmentation and retransmission processing, and sequence control of higher layer data. The BAP layer is mainly used for backhaul link routing and bearer mapping. The PDCP layer is mainly used for header compression and decompression to reduce bit traffic that needs to be transmitted over a wireless interface.

The following describes the data processing method provided in embodiments of this application with reference to FIG. 1 to FIG. 4.

It should be noted that a name of a message (or information), a name of a parameter in the message (or information), or the like in the following embodiments of this application is only an example, and may be another name during specific implementation. This is not specifically limited in embodiments of this application.

It may be understood that, in embodiments of this application, the transmit end device may perform some or all of steps in embodiments of this application. The steps are only examples. In embodiments of this application, other steps or variations of various steps may further be performed. In addition, the steps may be performed in a sequence different from a sequence presented in embodiments of this application, and not all steps in embodiments of this application need to be performed.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

Figure 5:
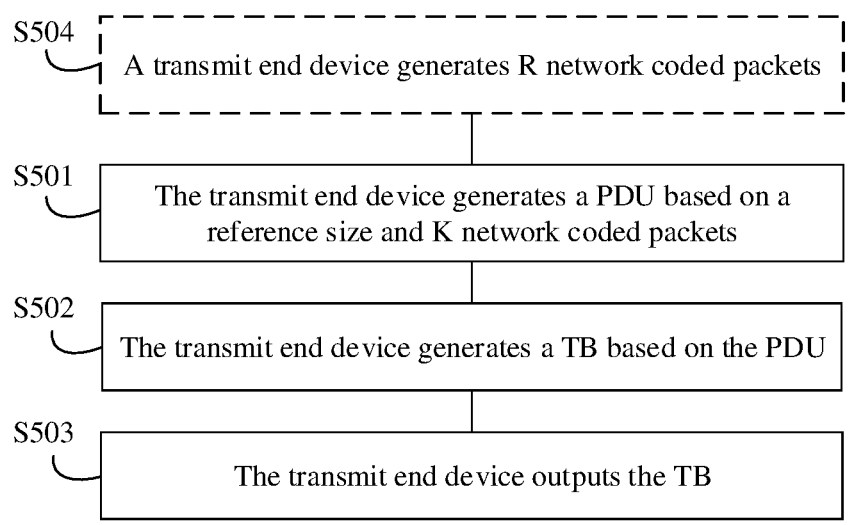
FIG. 5 is a schematic flowchart of a data processing method according to an embodiment of this application.

FIG. 5 shows a data processing method according to an embodiment of this application. The data processing method includes the following steps.

S501: A transmit end device generates a PDU based on a reference size and K network coded packets.

The reference size (size) is a size of a reference TB, a size of a reference PDU, or a size of a reference SDU, where K is a positive integer. The network coded packet may be a data packet obtained by performing network coding on an original data unit and adding header information or adding header information and other information.

It should be noted that, in this embodiment of this application, the "size" may alternatively be understood as a "length", and the "size" and the "length" can be interchanged with each other. This is uniformly described herein.

Optionally, the reference TB may be a TB to be generated by the transmit end device. The reference PDU may be a PDU of a first protocol layer required for generating the reference TB. The reference SDU may be an SDU of the first protocol layer required for generating the reference PDU. The reference size may be determined by the transmit end device based on a size of a physical resource and/or channel state information, or may be semi-statically configured by a network device. This is not specifically limited in this embodiment of this application.

Optionally, the first protocol layer may be one of the following: a MAC layer, an RLC layer, a BAP layer, a PDCP layer, or a protocol layer having a network coding function. The protocol layer having the network coding function may be a new protocol layer other than the MAC layer, the RLC layer, the BAP layer, and the PDCP layer. The protocol layer may be referred to as a network coding layer. The protocol layer may be located above the PDCP layer, located above the BAP layer, located between the PDCP layer and the RLC layer, located between the RLC layer and the MAC layer, or located between the MAC layer and a physical layer. This is not specifically limited in this embodiment of this application.

It may be understood that the size of the reference SDU is less than or equal to the size of the reference PDU, and the size of the reference PDU is less than or equal to the size of the reference TB. The transmit end device may determine the size of the reference SDU based on the size of the reference PDU. Likewise, the transmit end device may determine the size of the reference PDU based on the size of the reference SDU. The transmit end device may further determine the size of the reference PDU and/or the size of the reference SDU based on the size of the reference TB. When the first protocol layer is the MAC layer, the reference TB may be understood as the reference PDU. To be specific, the reference TB and the reference PDU are the same, and have a same size.

Optionally, that a transmit end device generates a PDU based on a reference size and K network coded packets may include: The transmit end device obtains the K network coded packets based on the reference size, and then generates the PDU based on the K network coded packets.

Optionally, when the first protocol layer is not the MAC layer, and the reference size is the size of the reference TB, that the transmit end device obtains the K network coded packets based on the reference size may include: The transmit end device determines the size of the reference PDU or the reference SDU based on the reference size, and then obtains the K network coded packets based on the size of the reference PDU or the reference SDU.

Optionally, the K network coded packets may be to-be-sent network coded packets buffered by the transmit end device. Correspondingly, that the transmit end device obtains the K network coded packets may be understood as follows: The transmit end device selects the K network coded packets from to-be-sent network coded packets.

The following relationship may exist between a total size of the K network coded packets and the reference size:

Relationship 1: A total size of the first K−1 network coded packets in the K network coded packets is less than the reference size, and the total size of the K network coded packets is greater than or equal to the reference size.

Figure 6:
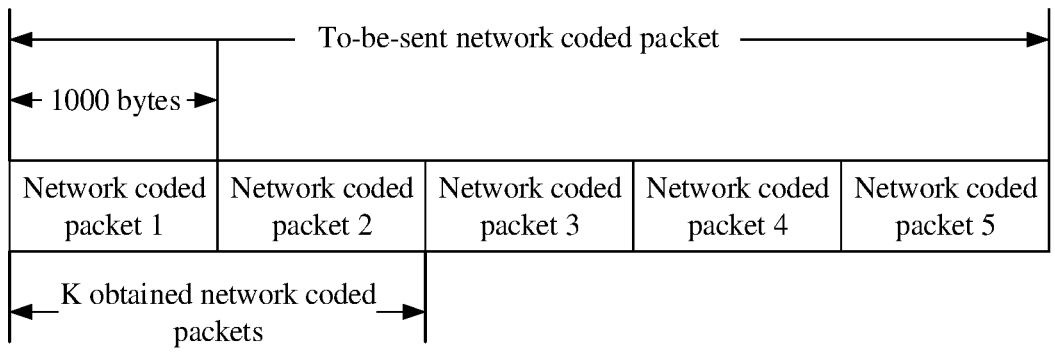
FIG. 6 and FIG. 7 each are a schematic diagram of obtaining K network coded packets according to an embodiment of this application.

For example, as shown in FIG. 6, it is assumed that the network coded packets to be sent by the transmit end device are network coded packets 1 to 5. A size of each network coded packet is 1000 bytes, and the reference size is 1500 bytes. In this case, the size of 1000 bytes of the network coded packet 1 is less than the reference size of 1500 bytes. A total size of 2000 bytes of the network coded packet 1 and the network coded packet 2 is greater than the reference size of 1500 bytes. In this case, the transmit end device may determine that K is 2, and the K network coded packets are the network coded packet 1 and the network coded packet 2.

Relationship 2: The total size of the K network coded packets is less than or equal to the reference size, and a total size of the K network coded packets and a third network coded packet is greater than the reference size. The third network coded packet is a network coded packet other than the K network coded packets.

It should be noted that, in addition to the "third network coded packet", a "first network coded packet" and a "second network coded packet" are further involved in embodiments of this application, and are described in subsequent embodiments.

Figure 7:
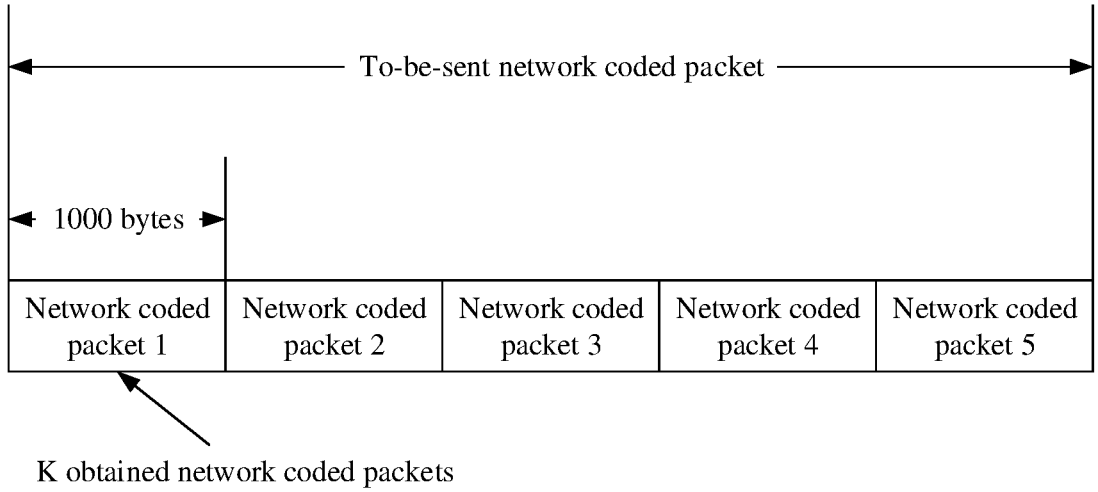

For example, as shown in FIG. 7, it is assumed that the network coded packets to be sent by the transmit end device are network coded packets 1 to 5. A size of each network coded packet is 1000 bytes, and the reference size is 1500 bytes. In this case, the size of 1000 bytes of the network coded packet 1 is less than the reference size of 1500 bytes. A total size of 2000 bytes of the network coded packet 1 and the network coded packet 2 is greater than the reference size of 1500 bytes. In this case, the transmit end device may determine that K is 1, each of the K network coded packets is the network coded packet 1, and the third network coded packet is the network coded packet 2.

Optionally, in the foregoing two relationships, when the first protocol layer is not the MAC layer, and the reference size is the size of the reference TB, the reference size in the foregoing two relationships may be replaced with the size of the reference PDU or the size of the reference SDU. In other words, the transmit end device determines the size of the reference PDU or the reference SDU based on the size of the reference TB, and then compares the size of the reference PDU or the reference SDU with the total size of the K network coded packets.

Optionally, in an implementation scenario of this embodiment of this application, for example, the operation of generating, by the transmit end device, the PDU based on the reference size and the K network coded packets may be completed by a first protocol layer entity of the transmit end device. In this case, when the reference size is determined by the transmit end device, for example, the reference size may be determined by a MAC layer entity of the transmit end device. When the first protocol layer is located above the MAC layer, the MAC layer entity may send size indication information to the first protocol layer entity, to indicate the reference size.

S502: The transmit end device generates a TB based on the PDU.

The PDU is the PDU generated in step S501.

Optionally, for example, that the transmit end device generates a TB based on the PDU may include: The transmit end device adds, to the PDU, a protocol header of each of the first protocol layer to the MAC layer (including the MAC layer), to obtain the TB.

S503: The transmit end device outputs the TB.

The TB is the TB generated in step S502.

Optionally, that the transmit end device outputs the TB may be: The transmit end device sends the TB to a receive end device. Alternatively, that the transmit end device outputs the TB may be: The MAC layer entity of the transmit end device sends an MAC layer PDU to a physical layer entity of the transmit end device, where the MAC layer PDU is referred to as the TB at the physical layer.

Based on this solution, because the PDU may be generated based on an integer quantity of network coded packets, and then the TB is generated based on the PDU, so that the generated TB includes the integer quantity of network coded packets, a case in which some bits of a network coded packet are correctly transmitted but decoding cannot be performed by using the bits can be avoided, thereby improving spectral efficiency.

Optionally, in an implementation scenario of this embodiment of this application, before step S501, the data processing method provided in this embodiment of this application further includes the following step S504.

S504: The transmit end device generates R network coded packets.

The R network coded packets are network coded packets to be sent by the transmit end device, where R is a positive integer greater than or equal to K.

Optionally, the transmit end device may generate the R network coded packets by using the following steps.

1. The Transmit End Device Determines X Network Coded Blocks, where X is a Positive Integer.

Each of the X network coded blocks includes a plurality of original data units, and the network coded block is uniquely identified by using a block identity (block ID).

The "network coded block" in this embodiment of this application may also be referred to as a "network coded group". Correspondingly, the network coded group is uniquely identified by using a group identity (group ID). Alternatively, the "network coded block" may also be referred to as a "network coded batch", and correspondingly, each network coded batch is uniquely identified by using a batch identity (batch ID). Alternatively, the "network coded block" may also be referred to as a "network coded generation", and correspondingly, each network coded generation is uniquely identified by using a generation identity (generation ID). The "network coded block", "network coded group", "network coded batch", and "network coded generation" can be replaced with each other.

The "data unit" in this embodiment of this application may also be referred to as a "data segment", a "data block", or a "data packet", and the four can be replaced with each other. This is not specifically limited in this embodiment of this application.

Optionally, sizes of different original data units included in a same network coded block may be the same or different. Quantities of the original data units included in different network coded blocks may be the same or different. This is not specifically limited in this embodiment of this application.

Optionally, the transmit end device may determine, based on a PDU of a second protocol layer and with reference to a network coding parameter and/or a preset rule, the plurality of original data units included in each network coded block. The second protocol layer is an upper-layer protocol layer of the first protocol layer. An upper-layer protocol layer of a protocol layer is the last protocol layer at which data is processed before the protocol layer.

Optionally, the network coding parameter may include a size of the original data unit included in the network coded block and/or a quantity of original data units included in the network coded block. The size of the original data unit is less than or equal to a first threshold. The network coding parameter and/or the first threshold may be configured by the network device, may be predefined, or may be determined by the transmit end device. This is not specifically limited in this embodiment of this application.

Figure 8:
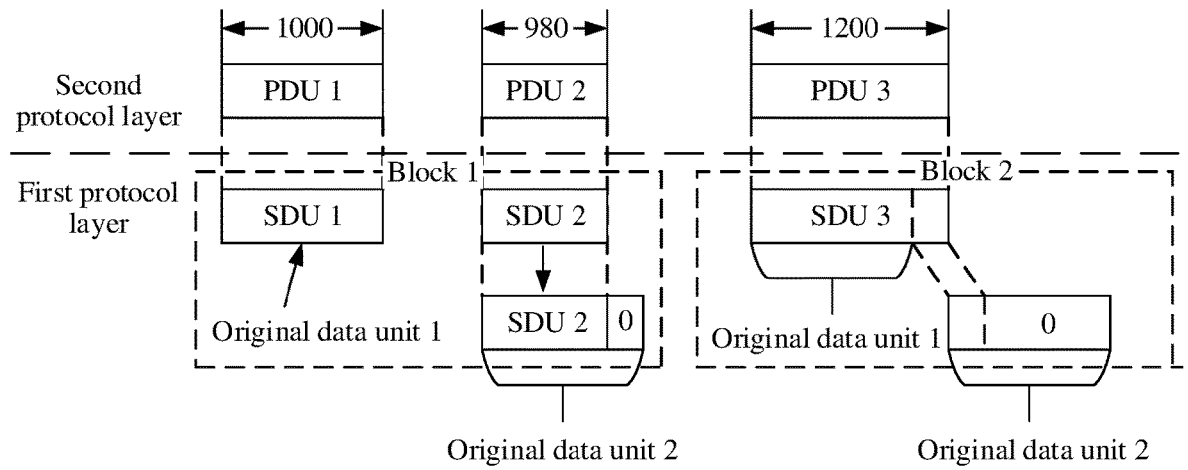
FIG. 8 to FIG. 10b each are a schematic diagram of determining a network coded block according to an embodiment of this application.

For example, as shown in FIG. 8, it is assumed that there are three PDUs of the second protocol layer at a current moment, sizes of the PDUs are respectively 1000 bytes, 980 bytes, and 1200 bytes, the first threshold is 2000 bytes, X is 2, and in the network coding parameter, the size of the original data unit included in the network coded block is 1000 bytes, and the quantity of original data units included in the network coded block is 2. In this case, that the transmit end device determines, based on a PDU of a second protocol layer and with reference to a network coding parameter, the plurality of original data units included in the network coded block may be: The transmit end device determines that the PDU that is of the second protocol layer and whose size is 1000 bytes and the PDU that is of the second protocol layer and whose size is 980 bytes belong to a network coded block 1, and the PDU that is of the second protocol layer and whose size is 1200 bytes belongs to a network coded block 2. Then, because the size of the original data unit is 1000 bytes, the transmit end device performs zero-padding on the PDU that is of the second protocol layer and whose size is 980 bytes in the network coded block 1 to 1000 bytes. The transmit end device first segments the PDU that is of the second protocol layer and whose size is 1200 bytes in the network coded block 2, and then performs zero-padding to obtain two original data units whose sizes each are 1000 bytes.

It should be noted that the PDU of the second protocol layer may be considered as the SDU of the first protocol layer. Therefore, in FIG. 8, a PDU 1 of the second protocol layer is written as an SDU 1 at the first protocol layer, and so on. Subsequently, a similar accompanying drawing may be understood based on this. This is uniformly described herein.

Optionally, the preset rule may include: One PDU of the second protocol layer is used as one original data unit; or P PDUs of the second protocol layer are used as M original data units, where P is a positive integer, and M is a positive integer greater than or equal to 2.

Figure 9:
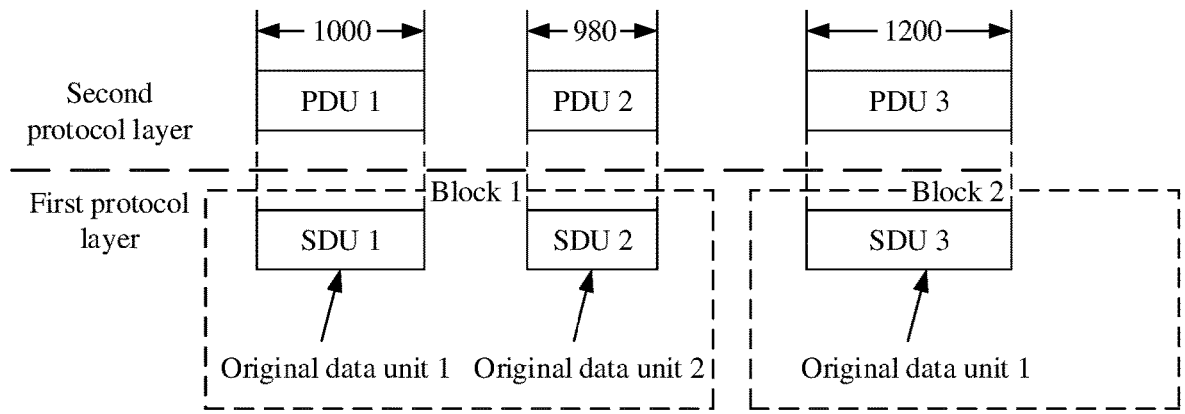

For example, as shown in FIG. 9, it is assumed that there are three PDUs of the second protocol layer at a current moment, sizes of the PDUs are respectively 1000 bytes, 980 bytes, and 1200 bytes, X is 2, and the preset rule is that one PDU of the second protocol layer is used as one original data unit. In this case, the transmit end device may use the first two PDUs of the second protocol layer as two original data units in the network coded block 1, and use the last PDU of the second protocol layer as an original data unit in the network coded block 2.

Figure 10A:
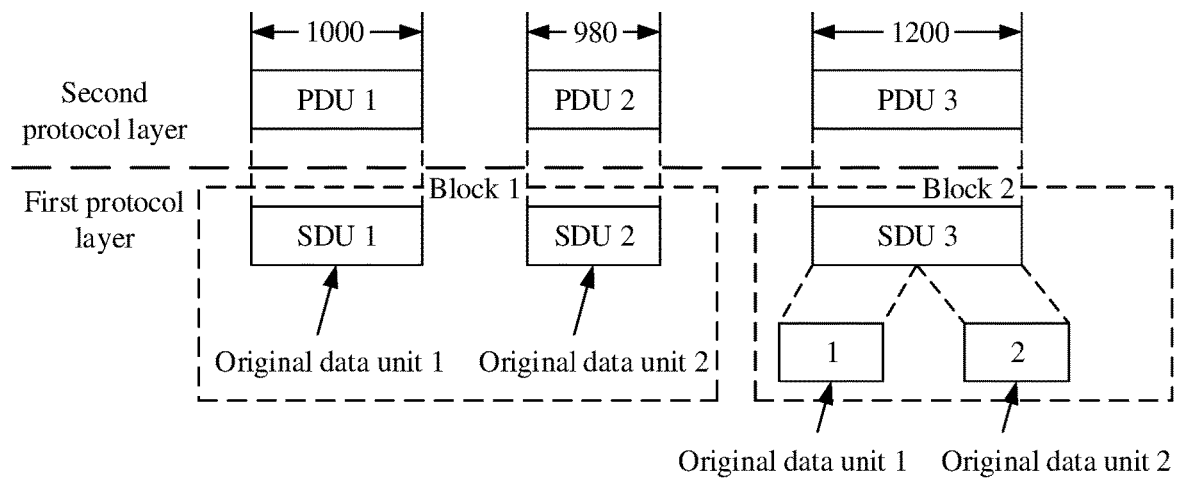

Alternatively, as shown in FIG. 10a, if the preset rule is that the P PDUs of the second protocol layer are used as M original data units, where P is 3, M is 4, and X is 2, the transmit end device may use the first two PDUs of the second protocol layer as two original data units in the network coded block 1, and equally divide the last PDU of the second protocol layer into two original data units in the network coded block 2.

Figure 10B:
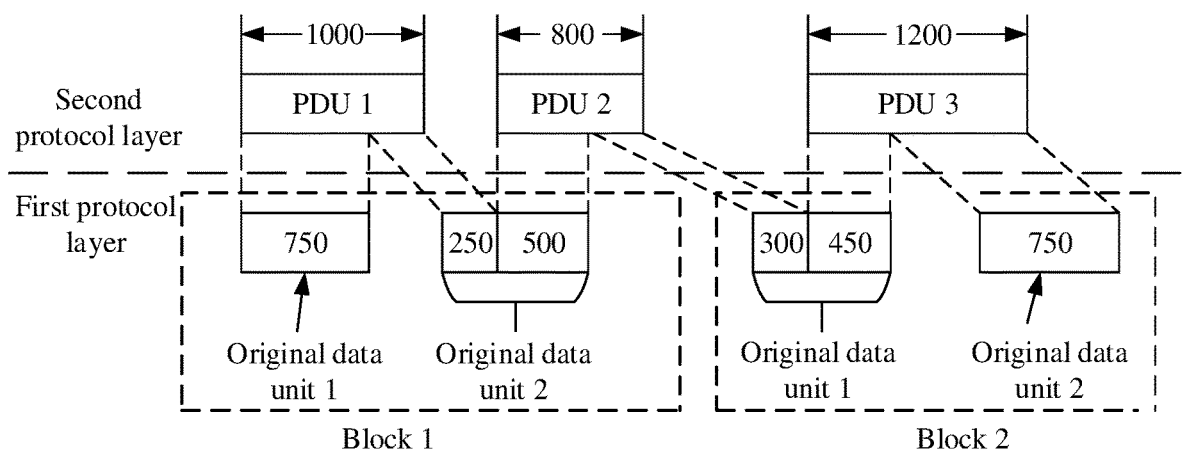

Alternatively, if the preset rule is that the P PDUs of the second protocol layer are used as M original data units, that the transmit end device determines, based on a PDU of a second protocol layer and with reference to a preset rule, the plurality of original data units included in the network coded block may be: The transmit end device equally divides the P PDUs of the second protocol layer into the M original data units. For example, as shown in FIG. 10b, P is 3, M is 4, X is 2, and sizes of the three PDUs are respectively 1000 bytes, 800 bytes, and 1200 bytes. In this case, the transmit end device may use the first 750 bytes of a first PDU as an original data unit in the network coded block 1, use the last 250 bytes of the first PDU and the first 500 bytes of a second PDU as another original data unit in the network coded block 1, use the last 300 bytes of the second PDU and the first 450 bytes of a third PDU as an original data unit in the network coded block 2, and use the last 750 bytes of the third PDU used as another original data unit in the network coded block 2.

It may be understood that the method for determining the original data units shown in FIG. 8, FIG. 9, FIG. 10a, or FIG. 10b is only an example for descriptions in this embodiment of this application. There may be another determining method in actual application. The method for determining the original data units is not limited in this embodiment of this application.

2. The Transmit End Device Generates the R Network Coded Packets Based on the X Network Coded Blocks.

Optionally, the transmit end device may separately perform, by using the network coded block as a granularity, network coding on the plurality of original data units included in each network coded block to obtain R network coded data units in total. Then, header information corresponding to an $i^{th}$ network coded data unit in the R network coded data units is added, to obtain an $i^{th}$ network coded packet, where i is a positive integer from 1 to R. The header information corresponding to the $i^{th}$ network coded data unit may include information used to indicate a coding coefficient of the $i^{th}$ network coded packet and/or an identifier of a network coded block x. The coding coefficient of the $i^{th}$ network coded packet is a coefficient used when network coding is performed on the original data units to generate the $i^{th}$ network coded data unit. The network coded block x is a network coded block corresponding to the $i^{th}$ network coded data unit. To be specific, the $i^{th}$ network coded data unit may be obtained after network coding is performed on a plurality of original data units included in the network coded block x, where x is a positive integer from 1 to X.

It should be noted that, the header information corresponding to the $i^{th}$ network coded data unit may be understood as header information of the $i^{th}$ network coded packet, and the header information corresponding to the $i^{th}$ network coded data unit is referred to as the header information of the $i^{th}$ network coded packet in the following embodiment of this application. The network coded block x may also be understood as a network coded block to which the $i^{th}$ network coded unit belongs or a network coded block to which the $i^{th}$ network coded packet belongs.

Optionally, the header information of the $i^{th}$ network coded packet may further include one or more of the following: identification information of the $i^{th}$ network coded packet in the network coded block x to which the $i^{th}$ network coded packet belongs, information about a quantity of original data units included in the network coded block x to which the $i^{th}$ network coded packet belongs, or a size of the $i^{th}$ network coded data unit.

Optionally, the header information of the $i^{th}$ network coded packet may further include information used to indicate a coding coefficient of a $j^{th}$ network coded packet in the R network coded packets, where j is a positive integer from 1 to R, and j is unequal to i. In other words, the header information of the $i^{th}$ network coded packet may include information used to indicate a coding coefficient of another network coded packet. Based on this solution, when some bits of the $j^{th}$ network coded packet are correctly transmitted, but header information of the $j^{th}$ network coded packet fails to be transmitted, decoding may be performed by using the correctly transmitted bits of the $j^{th}$ network coded packet and by using the information that is included in the header information of the correctly transmitted $i^{th}$ network coded packet and that is used to indicate the coding coefficient of the $j^{th}$ network coded packet.

Figure 11:
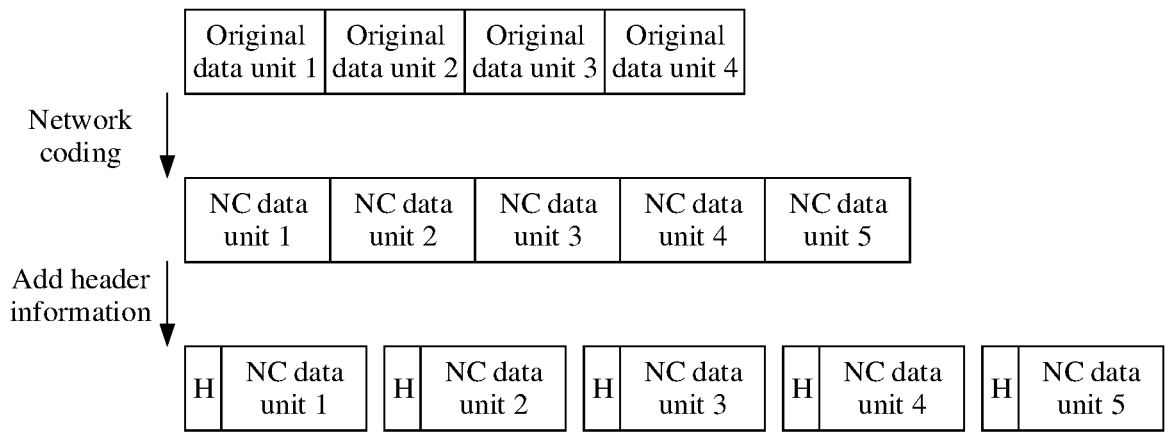
FIG. 11 is a schematic flowchart of generating a network coded packet according to an embodiment of this application.

For example, the transmit end device performs network coding on the plurality of original data units included in the network coded block x, where the network coded block x includes four original data units, and five network coded data units are obtained after network coding. FIG. 11 shows a process of performing network coding and adding the header information by the transmit end device, where NC refers to network coding.

Optionally, a coding scheme used when the transmit end device performs network coding on the original data unit may be predefined, may be preconfigured by the network device, or may be determined by the transmit end device. The coding scheme may be one of the following: RLNC, deterministic linear network coding, batch sparse code (BATS) coding, erasure code coding, and fountain code coding. For an RLNC coding principle, refer to the foregoing related descriptions. A difference between deterministic linear network coding and RLNC is that a coding coefficient used in deterministic linear network coding is not randomly selected, but is a coefficient specified or configured by the network device.

Optionally, when the transmit end device performs network coding on the plurality of original data units included in the network coded block x, if sizes of the plurality of original data units included in the network coded block x are different, the transmit end device may perform processing by using the following two possible implementations.

In a possible implementation, the transmit end device may supplement, to a standard size, an original data unit whose size is less than the standard size in the plurality of original data units included in the network coded block x, to obtain a plurality of adjusted original data units, and perform network coding on the plurality of adjusted original data units. The standard size may be a size of an original data unit with a longest size in the plurality of original data units included in the network coded block x, may be a preset size, or may be a size preconfigured by the network device.

Figure 12:
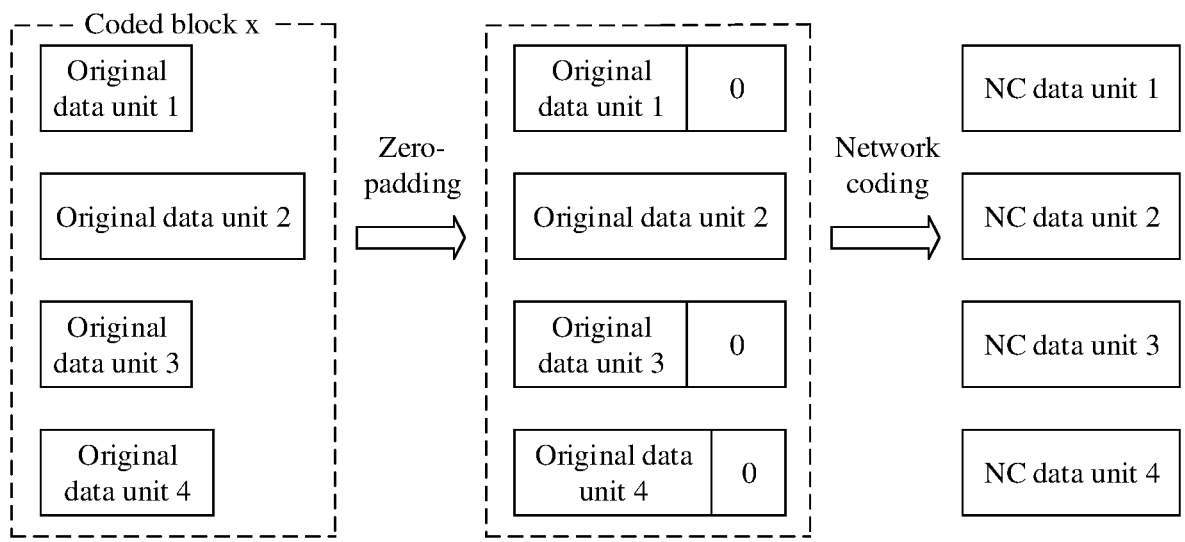
FIG. 12 to FIG. 14 each are a schematic flowchart of network coding according to an embodiment of this application.

For example, the network coded block x includes four original data units, sizes of the four original data units are different, and the standard size is the size of the original data unit with the longest size in the four original data units. A process in which the transmit end device performs network coding on the original data unit in the network coded block x may be shown in FIG. 12.

In another possible implementation, the transmit end device may determine a plurality of original data unit groups. Each of the plurality of original data unit groups includes a data segment of at least one of the plurality of original data units included in the network coded block x. Then, the transmit end device performs network coding on the data segment in the plurality of original data unit groups.

Optionally, when determining the plurality of original data unit groups, the transmit end device may align the first bits of the plurality of original data units included in the network coded block x, and determine a length-aligned part of each original data unit as a data segment in one original data unit group.

Figure 13:
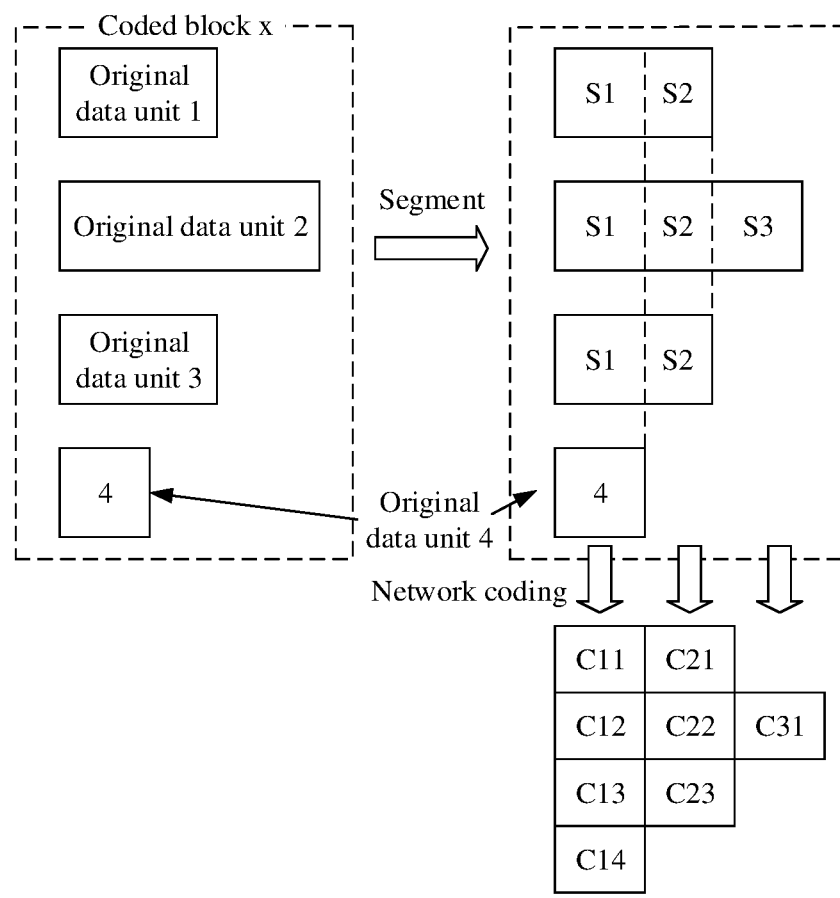

For example, as shown in FIG. 13, sizes of four original data units included in the network coded block x are different. After the first bits of the four original data units are aligned, three original data unit groups may be determined based on a length-aligned part of each original data unit. The first original data unit group includes a data segment S1 of an original data unit 1, a data segment S1 of an original data unit 2, a data segment S1 of an original data unit 3, and an original data unit 4. The second original data unit group includes a data segment S2 of the original data unit 1, a data segment S2 of the original data unit 2, and a data segment S2 of the original data unit 3. The third original data unit group includes a data segment S3 of the original data unit 2.

Then, the transmit end device performs network coding by using the original data unit group as a granularity. For example, as shown in FIG. 13, after network coding is performed on the data segments in the first original data unit group, coded segments C11, C12, C13, and C14 are obtained. After network coding is performed on the data segments in the second original data unit group, coded segments C21, C22, and C23 are obtained. After network coding is performed on the data segment in the third original data unit group, a coded segment C31 is obtained.

Further, optionally, the transmit end device may use one or more coded segments corresponding to each original data unit group as one network coded data unit, for example, use C11, C12, C13, and C14 as one network coded data unit; or the transmit end device may use one coded segment as one network coded data unit, for example, use C11 as one network coded data unit.

Alternatively, the transmit end device may further use one or more coded segments corresponding to a same coding coefficient as one network coded data unit. For example, as shown in FIG. 13, if the network coding method is RLNC, and data segments belonging to a same original data unit use same a coding coefficient during network coding, after network coding, coding coefficients corresponding to coded segments in a same row are the same. Therefore, C11 and C12 may be used as one network coded data unit, and so on. In this manner, because the coded segments with the same network coding coefficient are used as one network coded data unit, when header information of the network coded data unit is added, that the header information includes a plurality of pieces of information used to indicate different coding coefficients may be avoided, thereby reducing complexity of the header information and reducing resource wastes during transmission.

Optionally, when determining the plurality of original data unit groups, the transmit end device may alternatively not align the first bits of the plurality of original data units, but aligns some data segments, and then determines a length-aligned part of each original data unit as a data segment in one original data unit group.

Figure 14:
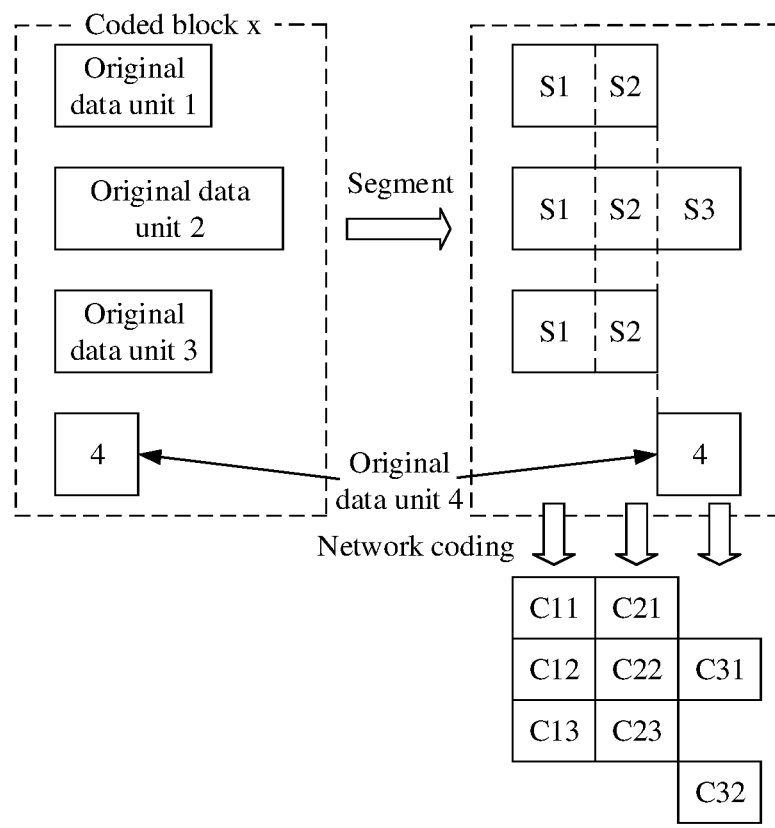

For example, as shown in FIG. 14, sizes of four original data units included in the network coded block x are different. After the last bit of a fourth original data unit is aligned with the last bit of a second original data unit, three original data unit groups may also be determined based on a length-aligned part of each original data unit. A method for separately performing network coding on the three original data unit groups and determining a network coded data unit is similar to the method shown in FIG. 13, and reference may be made to the foregoing related descriptions.

In this way, the transmit end device may obtain to-be-sent network coded packets, and may obtain the K network coded packets from the to-be-sent network coded packets based on the reference size.

The following describes a method in which the transmit end device generates the PDU based on the K network coded packets in the foregoing step. In different implementation scenarios of this embodiment of this application, the PDU generated by the transmit end device may include all of the K network coded packets, or may include some network coded packets and segments of the remaining network coded packets in the K network coded packets.

Optionally, in an implementation scenario of this embodiment of this application, the PDU generated by the transmit end device includes all of the K network coded packets.

Figure 15:
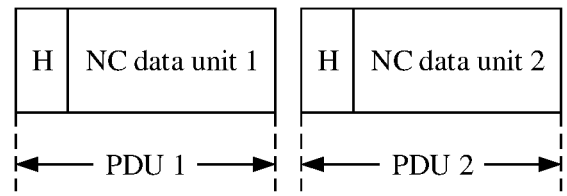
FIG. 15 to FIG. 20b each are a schematic diagram of a format of a PDU in an implementation according to an embodiment of this application.

In this scenario, in step S501, in a case in which the transmit end device compares the size of the reference PDU with the total size of the K network coded packets when obtaining the K network coded packets:

In a possible implementation, that a transmit end device generates a PDU based on K network coded packets may include: The transmit end device uses a $k^{th}$ network coded packet in the K network coded packets as a $k^{th}$ PDU. Header information of the $k^{th}$ network coded packet is used as a protocol header of the $k^{th}$ PDU, where k is a positive integer from 1 to K. That is, the transmit end device uses a network coded packet as a PDU. For example, K is 2. The PDU generated based on the K network coded packets may be shown in FIG. 15.

In another possible implementation, that a transmit end device generates a PDU based on K network coded packets may include: The transmit end device concatenates the K network coded packets to obtain the PDU. The PDU includes at least K protocol subheaders. Header information of a $k^{th}$ network coded packet in the K network coded packets is located in a $k^{th}$ protocol subheader of the PDU, where k is a positive integer from 1 to K.

Optionally, in this implementation, that header information of a $k^{th}$ network coded packet in the K network coded packets is located in a $k^{th}$ protocol subheader of the PDU may be understood as follows: The header information of the $k^{th}$ network coded packet is used as the $k^{th}$ protocol subheader of the PDU, to be specific, the $k^{th}$ protocol subheader of the PDU does not include other information other than the header information of the $k^{th}$ network coded packet. Alternatively, it may be understood that the header information of the $k^{th}$ network coded packet is used as a part of information in the $k^{th}$ protocol subheader of the PDU, to be specific, in addition to the header information of the $k^{th}$ network coded packet, the $k^{th}$ protocol subheader of the PDU further includes other information. In the following embodiment of this application, an example in which the header information of the $k^{th}$ network coded packet is used as the $k^{th}$ protocol subheader of the PDU is used for description.

Optionally, in this implementation, the PDU may have the following three formats.

Format 1: The first field after the $k^{th}$ protocol subheader of the PDU is padded with a network coded unit of the $k^{th}$ network coded packet.

Figure 16:
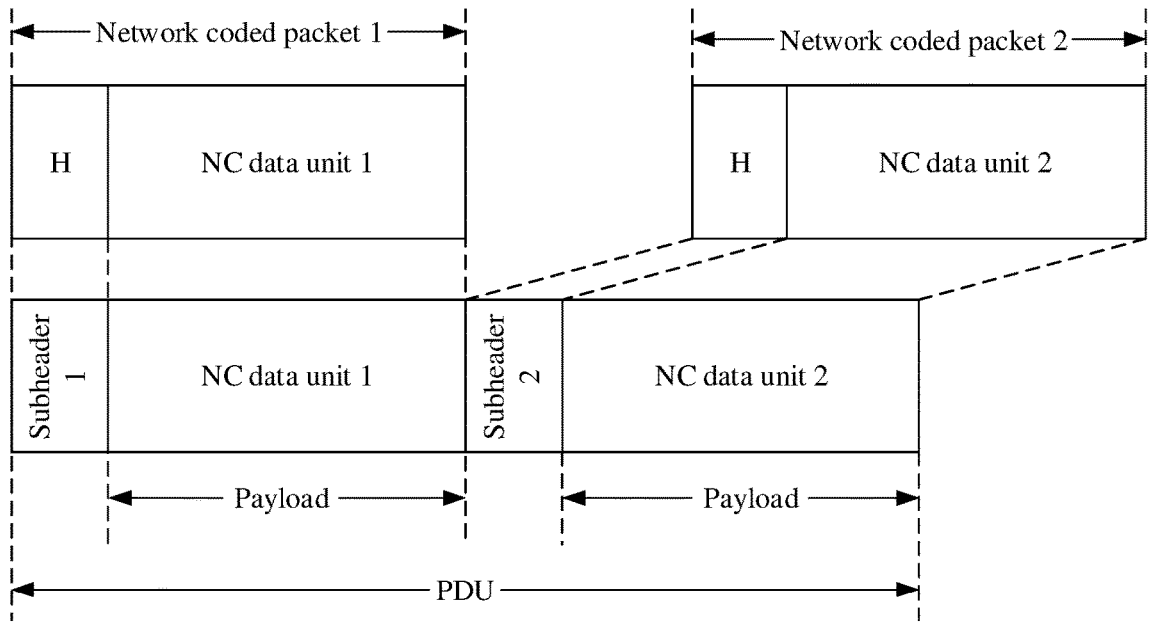

For example, K is 2. The PDU generated based on the K network coded packets may be shown in FIG. 16.

Format 2: The K protocol subheaders of the PDU are sequentially arranged to form a protocol header of the PDU.

Figure 17:
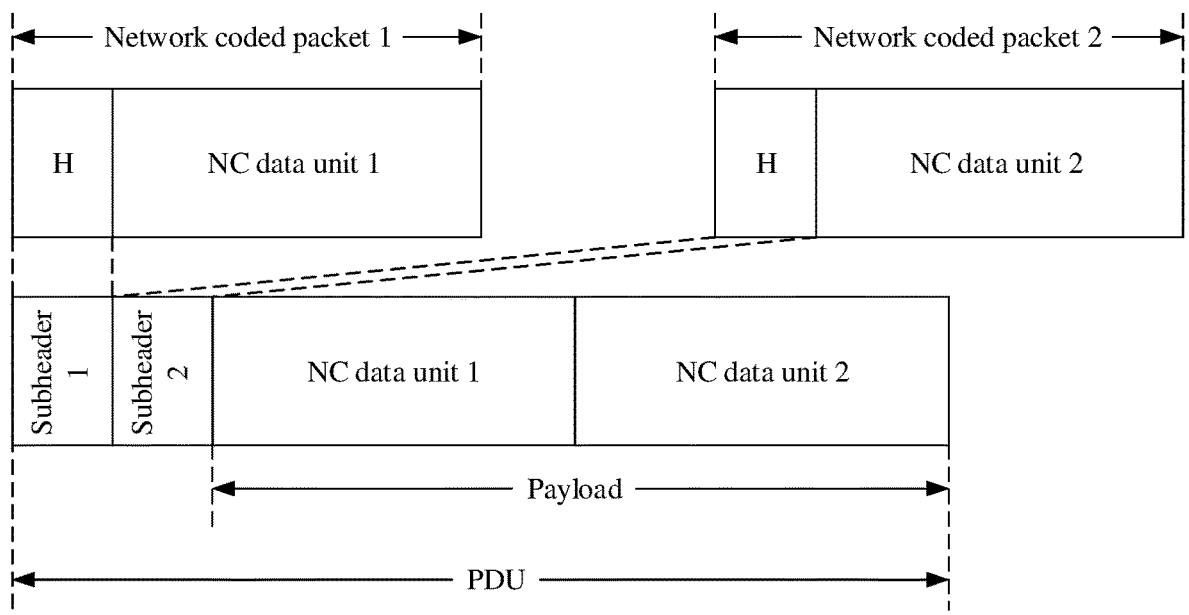

For example, K is 2. The PDU generated based on the K network coded packets may be shown in FIG. 17.

Format 3: The K protocol subheaders of the PDU are arranged sequentially, and the PDU further includes a $(K+1)^{th}$ protocol subheader.

Information in a $(K+1)^{th}$ protocol subheader of the PDU is used to indicate one or more of the following: a quantity of network coded units included in the PDU, a size of the PDU, and a size of a field other than the protocol header in the PDU.

Figure 18:
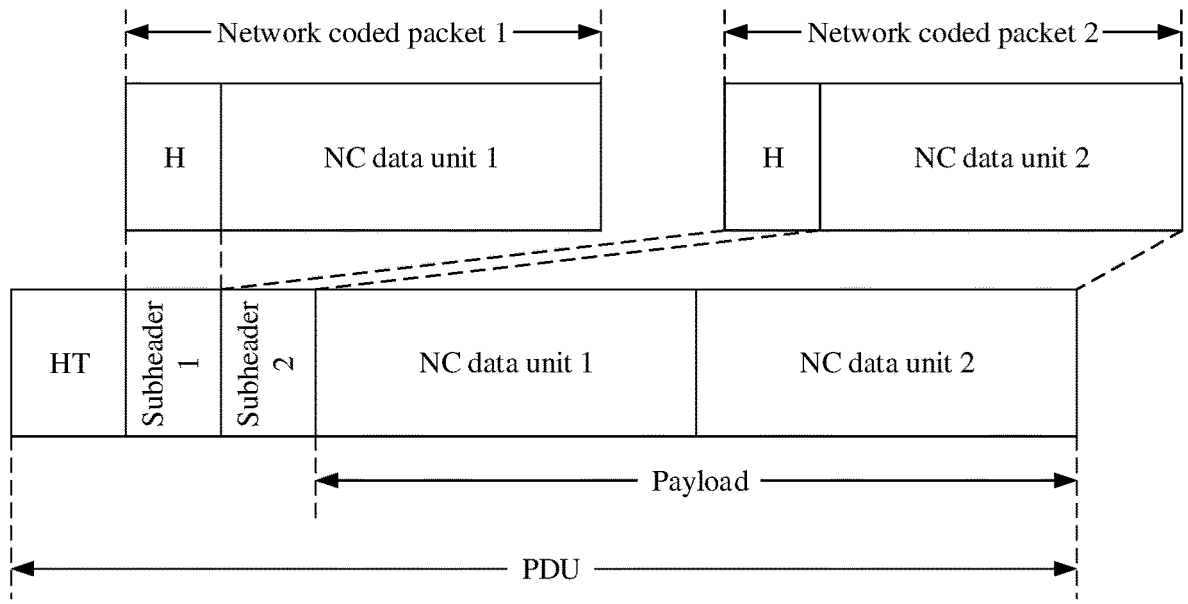

For example, K is 2. The PDU generated based on the K network coded packets may be shown in FIG. 18. HT represents the $(K+1)^{th}$ protocol subheader of the PDU.

It may be understood that, in this scenario, when the total size of the K network coded packets and the reference size meet the relationship 1, the size of the generated PDU is greater than or equal to the size of the reference PDU. Correspondingly, a size of the TB generated in step S502 is greater than or equal to the size of the reference TB. When the total size of the K network coded packets and the reference size meet the relationship 2, the size of the generated PDU is less than or equal to the size of the reference PDU. Correspondingly, the size of the TB generated in step S502 is less than or equal to the size of the reference TB.

In step S501, in a case in which the transmit end device compares the size of the reference SDU with the total size of the K network coded packets when obtaining the K network coded packets, that a transmit end device generates a PDU based on K network coded packets may include: The transmit end device determines a payload based on the K network coded packets, and then the transmit end device generates the PDU based on the payload. An example is as follows.

Figure 19:
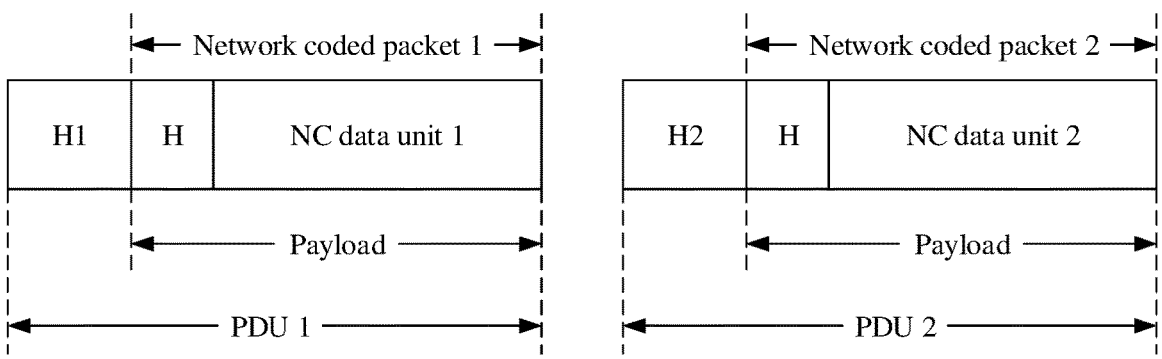

In a possible implementation, that a transmit end device generates a PDU based on K network coded packets may include: The transmit end device uses the $k^{th}$ network coded packet in the K network coded packets as a payload of a $k^{th}$ PDU, and adds a protocol header of the $k^{th}$ PDU to obtain the $k^{th}$ PDU. That is, the transmit end device uses a network coded packet as a payload of a PDU. For example, K is 2. The PDU generated based on the K network coded packets may be shown in FIG. 19, where H1 is a protocol header of the first PDU added by the transmit end device, and H2 is a protocol header of the second PDU added by the transmit end device.

Figure 20A:
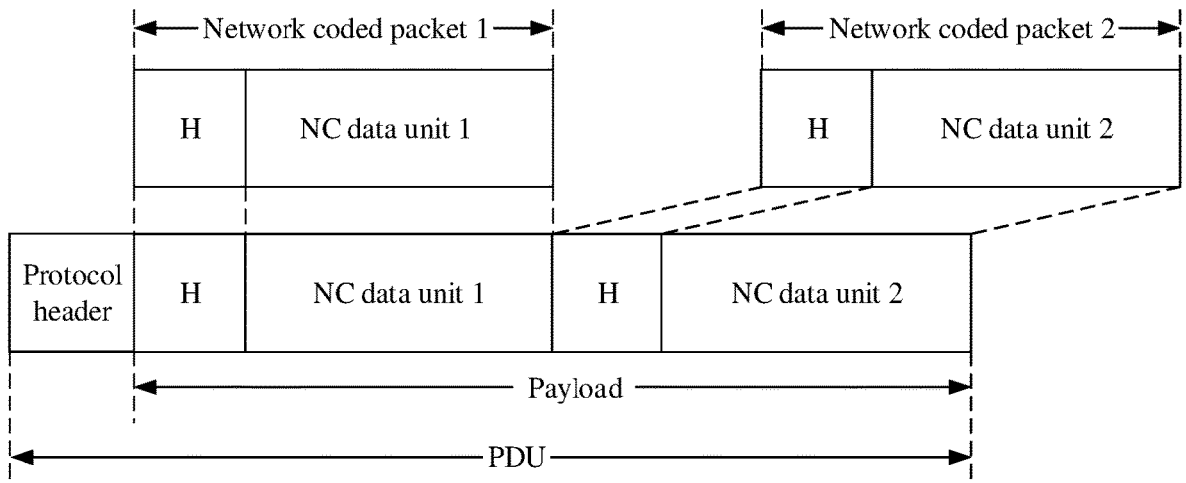
Figure 20B:
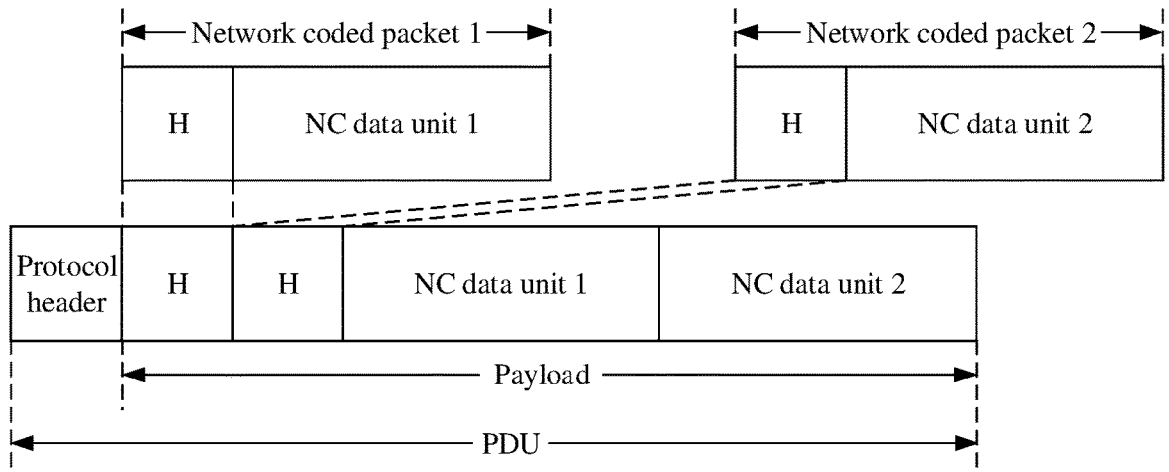

In another possible implementation, that a transmit end device generates a PDU based on K network coded packets may include: The transmit end device concatenates the K network coded packets to obtain the PDU. The K network coded packets are used as payloads of the PDU. The PDU includes a protocol header. Information in the protocol header is used to indicate a quantity of network coded units included in the PDU and/or a size of the PDU. For example, K is 2. The PDU generated based on the K network coded packets may be shown in FIG. 20*a* or shown in FIG. 20*b*.

It may be understood that, in this scenario, when the total size of the K network coded packets and the reference size meet the relationship 1, a size of the payload determined by the transmit end device is greater than or equal to the size of the reference SDU. Correspondingly, the size of the generated PDU is greater than or equal to the size of the reference PDU. The size of the TB generated in step S502 is greater than or equal to the size of the reference TB. When the total size of the K network coded packets and the reference size meet the relationship 2, the size of the payload determined by the transmit end device is less than or equal to the size of the reference SDU. Correspondingly, the size of the generated PDU is less than or equal to the size of the reference PDU. The size of the TB generated in step S502 is less than or equal to the size of the reference TB.

Optionally, in the foregoing implementations, the protocol header or the protocol subheader of the PDU may further include information used to indicate one or more of the following: the quantity of network coded units included in the PDU, the size of the PDU, and the size of the field other than the protocol header in the PDU.

It should be noted that, if the total size of the K network coded packets is less than the reference size, for example, in the example shown in FIG. 7, when generating the PDU based on the K network coded packets, the transmit end device may perform zero-padding on the K network coded packets, so that a total size of the K network coded packets on which zero-padded is performed is equal to the reference size, and then the transmit end device generates the PDU based on the K network coded packets on which zero-padded is performed.

It may be understood that the foregoing method for generating a PDU is also applicable when the transmit end device generates the PDU based on the network coded packet at a subsequent transmission opportunity.

Correspondingly, in this scenario, it is assumed that the transmit end device outputs the TB in step S503 includes: The transmit end device sends the TB to the receive end device. In this case, after receiving the TB, the receive end device may store, based on a network coded block to which the K network coded packets included in the TB belong, and then perform, based on header information of network coded packets belonging to a same network coded block, decoding on the network coded packets belonging to the same network coded block, to obtain an original data unit.

Optionally, after receiving the TB, the physical layer entity of the receive end device may perform CRC check on the TB. If CRC check is correct, the physical layer entity delivers a PDU of the first protocol layer included in the TB to a first protocol layer entity. The first protocol layer entity parses the PDU to obtain the K network coded packets included in the PDU, stores the K network coded packets based on the network coded block, and then performs decoding to obtain an original data unit.

Optionally, in another implementation scenario of this embodiment of this application, the PDU generated by the transmit end device includes some coded packets and segments of the remaining coded packets in the K network coded packets.

It should be noted that, in this scenario, the total size of the K network coded packets and the reference size meet the relationship 1.

Optionally, in this scenario, that a transmit end device generates a PDU based on K network coded packets may include: The transmit end device segments the last network coded packet in the K network coded packets to obtain a plurality of network coded packet segments, and generates the PDU based on the first K−1 network coded packets and a first network coded packet segment in the K network coded packets. The first network coded packet segment includes header information of the last network coded packet. The first network coded packet segment includes the first N network coded packet segments in the plurality of network coded packet segments, where N is a positive integer.

Optionally, that the first network coded packet segment includes header information of the last network coded packet may be understood as follows: The $1^{st}$ network coded packet segment in the N network coded packet segments included in the first network coded packet segment includes the header information of the last network coded packet. Alternatively, it may be understood that each of the N network coded packet segments included in the first network coded packet segment includes the header information of the last network coded packet. In this case, the transmit end device may add the header information of the last network coded packet to the last N−1 network coded packet segments included in the first network coded packet segment. The following embodiment of this application is described by using an example in which the $1^{st}$ network coded packet segment includes the header information of the last network coded packet.

Figure 21:
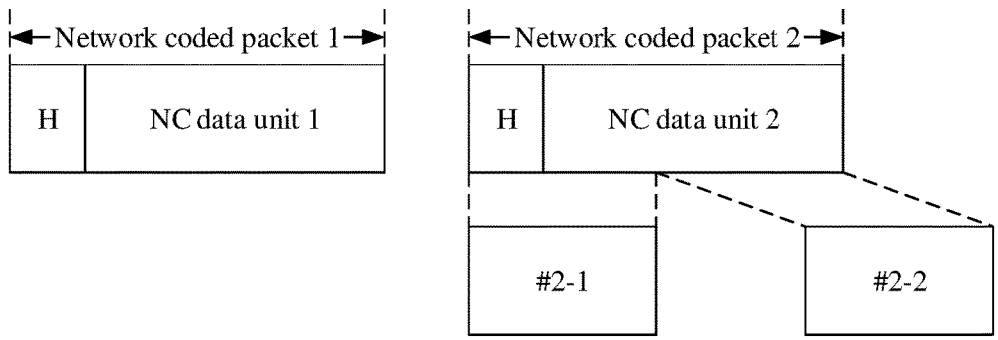
FIG. 21 is a schematic diagram of network coded packet segments according to an embodiment of this application.

For example, K is equal to 2, and N is equal to 1. As shown in FIG. 21, after the transmit end device segments the last network coded packet (a network coded packet 2) to obtain two network coded packet segments #2-1 and #2-2, where the first network coded packet segment is the network coded packet segment #2-1, and the network coded packet segment #2-1 includes header information of the network coded packet 2, the transmit end device finally generates the PDU based on a network coded packet 1 and the network coded packet segment #2-1.

Optionally, in this scenario, header information of the first network coded packet may further include information used to indicate a coding coefficient of the last network coded packet. The first network coded packet is one or more network coded packets of the first K−1 network coded packets.

For example, based on the example shown in FIG. 21, because the transmit end device finally generates the PDU based on the network coded packet 1 and the network coded packet segment #2-1, the network coded packet 1 and the network coded packet segment #2-1 are sent at a current transmission opportunity, and the network coded packet segment #2-2 may be sent at a next transmission opportunity. In this case, because the network coded packet segment #2-2 does not include information used to indicate a coding coefficient of the network coded packet 2, and the receive end device cannot obtain the information used to indicate the coding coefficient of the network coded packet 2 based on the network coded packet segment #2-2, the receive end device may not perform decoding by using the network coded packet segment #2-2. However, because header information of the network coded packet 1 includes the information used to indicate the coding coefficient of the network coded packet 2, the receive end device may obtain the information used to indicate the coding coefficient of the network coded packet 2 based on the header information of the network coded packet 1. In this way, during subsequent decoding, the receive end device may perform, based on the information used to indicate the coding coefficient of the network coded packet 2, decoding by using the network coded packet segment #2-2.

Based on this solution, when the first network coded packet is correctly transmitted, the receive end device can perform, based on the information used to indicate the coding coefficient of the last network coded packet, decoding by using a network coded packet segment other than the first network coded packet segment in the plurality of network coded packet segments. Therefore, spectral efficiency is improved.

Optionally, the transmit end device may further add segment header information of a second network coded packet segment. The second network coded packet segment is a network coded packet segment (for example, the network coded packet segment #2-2 shown in FIG. 21) other than the first network coded packet segment in the plurality of network coded packet segments. The segment header information is the information used to indicate the coding coefficient of the last network coded packet.

Optionally, after adding the segment header information of the second network coded packet segment, the transmit end device may use the second network coded packet segment and the segment header information of the second network coded packet segment as a new network coded packet, store the new network coded packet, and send the new network coded packet at a next transmission opportunity. It may be understood that, in this case, the $1^{st}$ network coded packet in the K network coded packets may include a segment of the last network coded packet and segment header information of the last network coded packet at a previous transmission opportunity.

Figure 22:
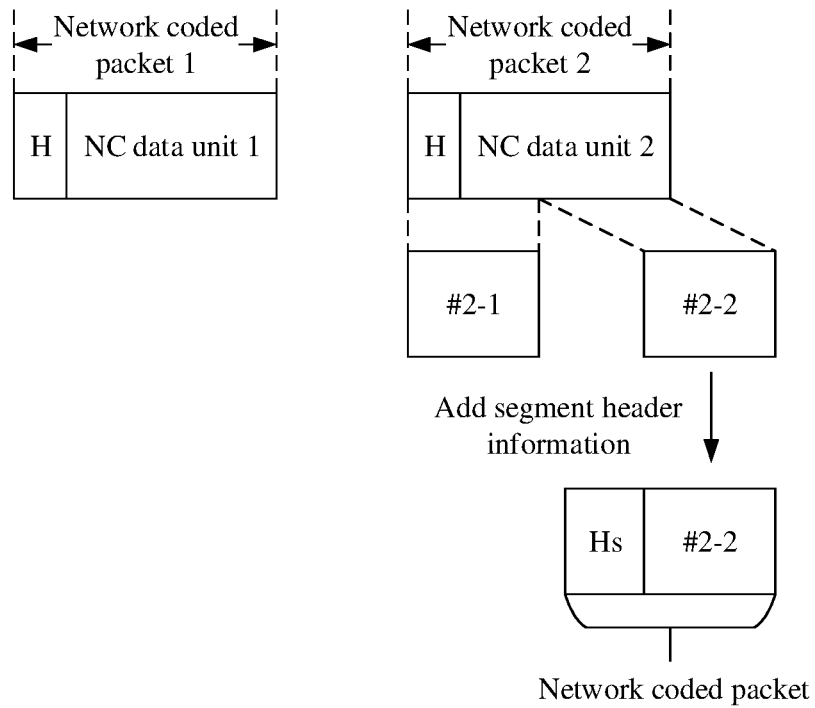
FIG. 22 is a schematic diagram of adding segment header information of a network coded packet segment according to an embodiment of this application.

For example, based on the example shown in FIG. 21, after the segment header information of the second network coded packet segment is added, a format of the obtained new network coded packet may be shown in FIG. 22, where Hs represents the segment header information of the second network coded packet segment.

Based on this possible implementation, when the second network coded packet segment is correctly transmitted in subsequent transmission, decoding, based on the segment header information of the second network coded packet segment, may be performed by using the second network coded packet segment. Therefore, spectral efficiency is improved.

Optionally, the segment header information of the second network coded packet segment may further include one or more of the following: information used to indicate an identifier of a network coded block to which the last network coded packet belongs, information used to indicate a length of the second network coded packet segment, information used to indicate a location of the second network coded packet segment in the plurality of network coded packet segments, or an offset value. The offset value is used to indicate a start location of the second network coded packet segment in the last network coded packet.

The following describes a method in which the transmit end device generates the PDU based on the first K−1 network coded packets and the first network coded packet segment in the foregoing step.

Figure 23:
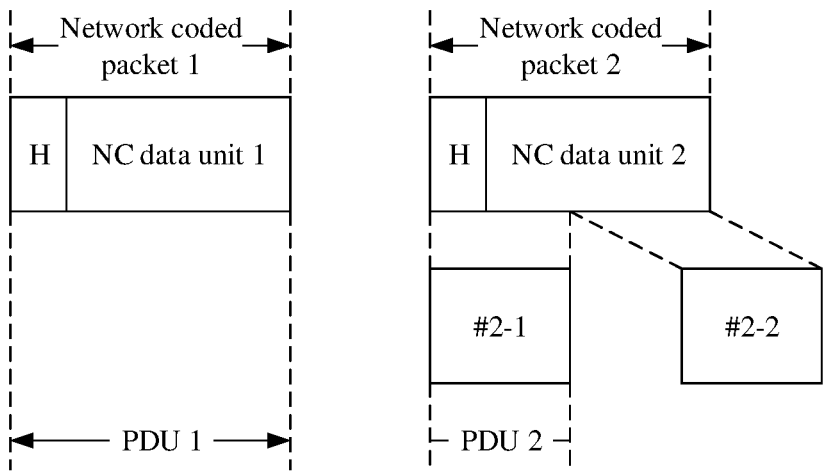
FIG. 23 to FIG. 29b each are a schematic diagram of a format of a PDU in another implementation according to an embodiment of this application.

In step S501, in a case in which the transmit end device compares the size of the reference PDU with the total size of the K network coded packets when obtaining the K network coded packets:

In a possible implementation, that the transmit end device generates the PDU based on the first K−1 network coded packets and the first network coded packet segment may include: The transmit end device uses an $m^{th}$ network coded packet in the first K−1 network coded packets as an $m^{th}$ PDU, where header information of the $m^{th}$ network coded packet is used as a protocol header of the $m^{th}$ PDU, and m is a positive integer from 1 to K−1, and uses the first network coded packet segment as a $K^{th}$ PDU, where the header information of the last network coded packet included in the first network coded packet segment is used as a protocol header of the $K^{th}$ PDU. For example, based on the example shown in FIG. 21, the PDU generated by the transmit end device may be shown in FIG. 23.

In another possible implementation, that the transmit end device generates the PDU based on the first K−1 network coded packets and the first network coded packet segment may include: The transmit end device concatenates the first K−1 network coded packets and the first network coded packet segment to obtain the PDU. The PDU includes at least K protocol subheaders. Header information of an $m^{th}$ network coded packet in the K−1 network coded packets is located in an $m^{th}$ protocol subheader of the PDU, where m is a positive integer from 1 to K−1. The header information of the last network coded packet included in the first network coded packet segment is located in a $K^{th}$ protocol subheader of the PDU.

Optionally, in this implementation, the PDU may have the following four formats.

Format 1: The first field after the $m^{th}$ protocol subheader of the PDU is padded with a network coded unit of the $m^{th}$ network coded packet. The first field after the $K^{th}$ protocol subheader of the PDU is padded with a data part of the first network coded packet segment.

Figure 24:
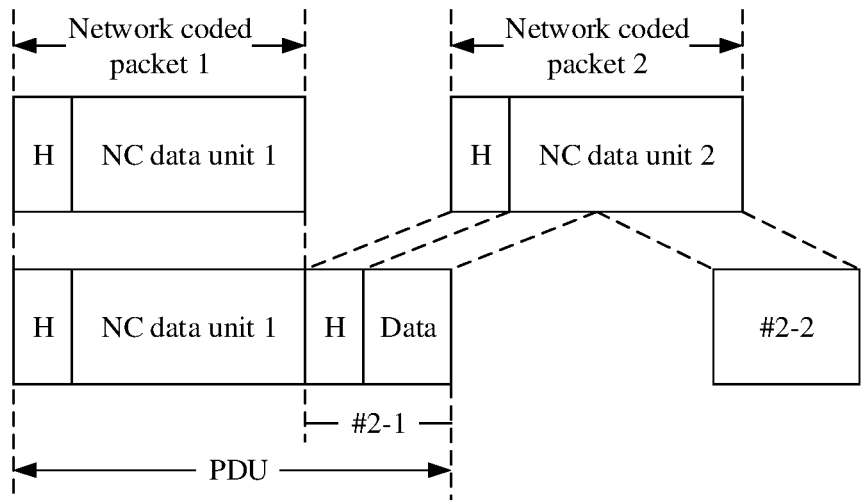

For example, based on the example shown in FIG. 21, the PDU generated by the transmit end device may be shown in FIG. 24.

Format 2: The first field after the $m^{th}$ protocol subheader of the PDU is padded with the network coded unit of the $m^{th}$ network coded packet. The first field after the $K^{th}$ protocol subheader of the PDU is padded with the data part of the first network coded packet segment. The PDU further includes a $(K+1)^{th}$ protocol subheader.

Information in the $(K+1)^{th}$ protocol subheader of the PDU is used to indicate one or more of the following: the quantity of network coded units included in the PDU, the size of the PDU, and the size of the field other than the protocol header in the PDU.

Figure 25:
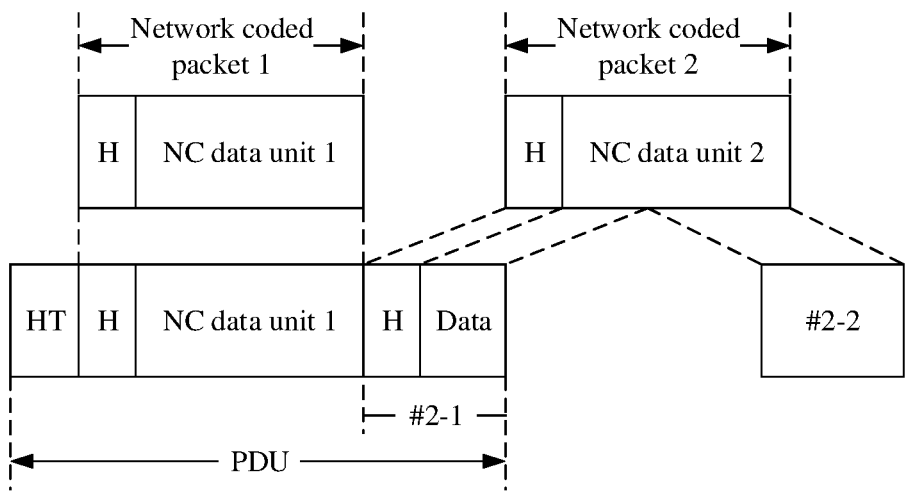

For example, based on the example shown in FIG. 21, the PDU generated by the transmit end device may be shown in FIG. 25, where HT represents the (K+1)th protocol subheader of the PDU.

Format 3: The K protocol subheaders of the PDU are sequentially arranged to form the protocol header of the PDU.

Figure 26:
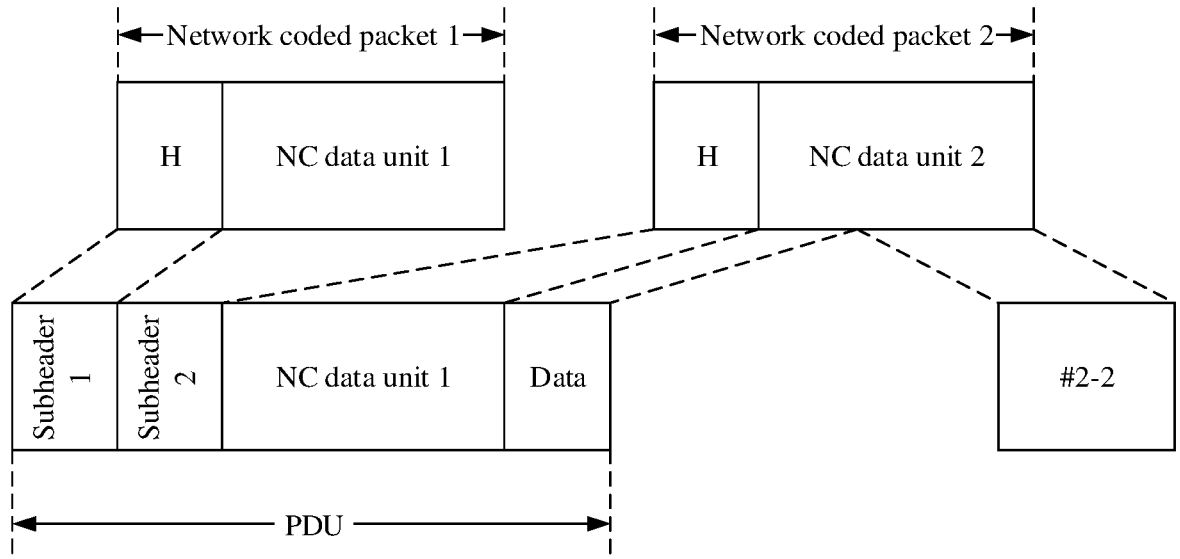

For example, based on the example shown in FIG. 21, the PDU generated by the transmit end device may be shown in FIG. 26.

Format 4: The K protocol subheaders of the PDU are arranged sequentially, and the PDU further includes the $(K+1)^{th}$ protocol subheader.

Information in the $(K+1)^{th}$ protocol subheader is used to indicate one or more of the following: the quantity of network coded units included in the PDU, the size of the PDU, and the size of the field other than the protocol header in the PDU.

Figure 27:
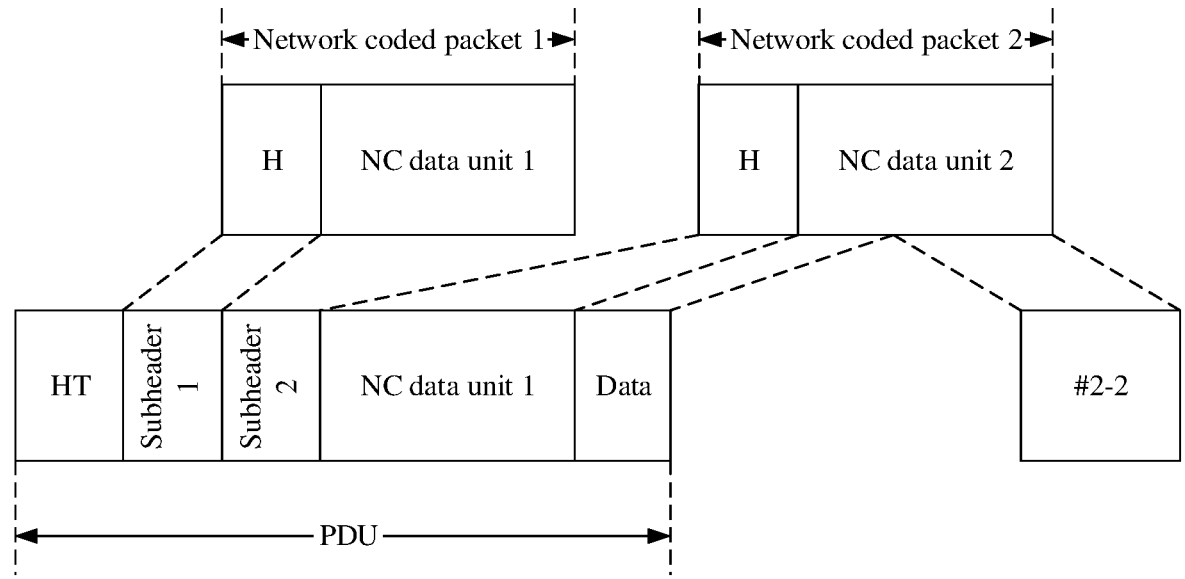

For example, based on the example shown in FIG. 21, the PDU generated by the transmit end device may be shown in FIG. 27.

It may be understood that, in this scenario, the size of the generated PDU is greater than or equal to the size of the reference PDU. Correspondingly, the size of the TB generated in step S502 is greater than or equal to the size of the reference TB.

In step S501, in a case in which the transmit end device compares the size of the reference SDU with the total size of the K network coded packets when obtaining the K network coded packets, that the transmit end device generates the PDU based on the first K−1 network coded packets and the first network coded packet segment may include: The transmit end device determines a payload based on the first K−1 network coded packets and the first network coded packet segment, and then the transmit end device generates the PDU based on the payload. An example is as follows.

Figure 28:
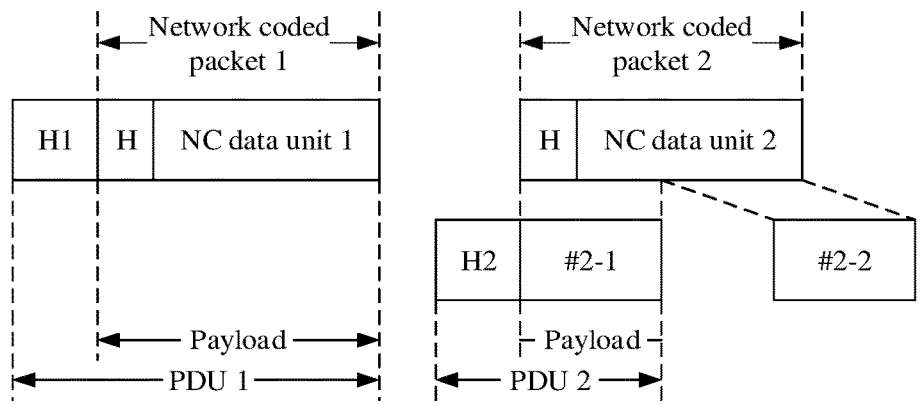

In a possible implementation, that the transmit end device generates the PDU based on the first K−1 network coded packets and the first network coded packet segment may include: The transmit end device uses the $m^{th}$ network coded packet in the first K−1 network coded packets as a payload of a $m^{th}$ PDU, and adds a protocol header of the $m^{th}$ PDU. The transmit end device uses the first network coded packet segment as a payload of a $K^{th}$ PDU, and adds a protocol header of the $K^{th}$ PDU. For example, based on the example shown in FIG. 21, the PDU generated by the transmit end device may be shown in FIG. 28, where H1 is a protocol header of the first PDU, and H2 is a protocol header of the second PDU.

In another possible implementation, that the transmit end device generates the PDU based on the first K−1 network coded packets and the first network coded packet segment may include: The transmit end device concatenates the first K−1 network coded packets and the first network coded packet segment to obtain the PDU. The first K−1 network coded packets and the first network coded packet segment are used as payloads of the PDU. The PDU includes a protocol header. Information in the protocol header is used to indicate one or more of the following: the quantity of network coded units included in the PDU, the size of the PDU, and the size of the field other than the protocol header in the PDU.

Figure 29A:
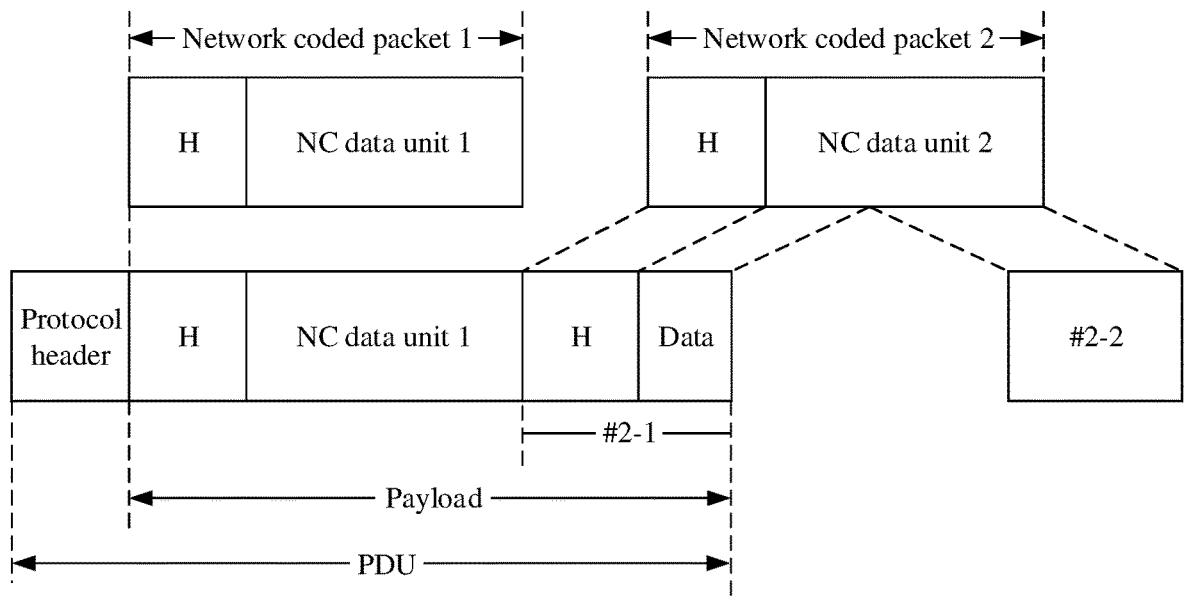
Figure 29B:
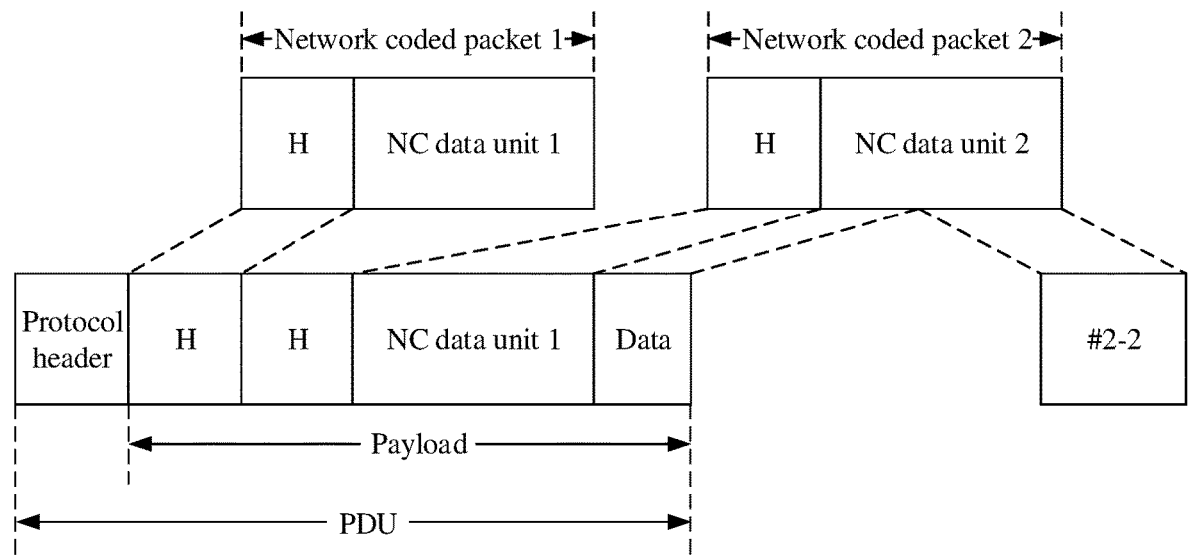

For example, based on the example shown in FIG. 21, the PDU generated by the transmit end device may be shown in FIG. 29a or FIG. 29b.

It may be understood that, in this scenario, a size of the payload determined by the transmit end device is greater than or equal to the size of the reference SDU. Correspondingly, the size of the generated PDU is greater than or equal to the size of the reference PDU. The size of the TB generated in step S502 is greater than or equal to the size of the reference TB.

Optionally, in the foregoing implementations, the protocol header or the protocol subheader of the PDU may further include information used to indicate one or more of the following: the quantity of network coded units included in the PDU, the size of the PDU, and the size of the field other than the protocol header in the PDU.

It may be understood that the foregoing method for generating a PDU is also applicable when the transmit end device generates the PDU based on the network coded packet and the network coded packet segment at a subsequent transmission opportunity.

Correspondingly, in this scenario, that the transmit end device outputs the TB in step S503 includes: The transmit end device sends the TB to the receive end device. Processing of the receive end device is similar to the foregoing processing method of the receive end device, where a difference is that the receive end performs segmenting and decoding based on the header information of the network coded packet and the segment header information of the network coded packet segment, and reference may be made to the foregoing related descriptions.

Optionally, in the foregoing two implementation scenarios, the transmit end device may further send request information to the receive end device. The request information is used to request first header information. The first header information includes header information of the second network coded packet and/or segment header information of a third network coded packet segment. The second network coded packet is one or more network coded packets in the K network coded packets. The third network coded packet segment is a segment of the last network coded packet in the K network coded packets.

Optionally, when the receive end device does not correctly receive the first header information, the receive end device may send the request information to the transmit end device, to request the transmit end device to retransmit the first header information. Correspondingly, after receiving the request information from the receive end device, the transmit end device may send the first header information to the receive end device based on the request information.

Based on this solution, when header information of a network coded packet or segment header information of a network coded packet segment is not correctly transmitted, the transmit end device may retransmit the header information or the segment header information, without retransmitting a data part of the network coded packet or the network coded packet segment, to reduce resource overheads.

It should be noted that the first protocol layer in this embodiment of this application may alternatively be the physical layer. In this case, the reference size is the size of the reference TB. Step S501 and step S502 may be combined into the following: The transmit end device generates the TB based on the reference size and the K network coded packets. In other words, the transmit end device does not generate the PDU, but generates the TB based on the reference size and the K network coded packets. For a method for obtaining the reference size, a method for obtaining the K network coded packets, and the like, refer to the foregoing related descriptions.

It may be understood that in the foregoing embodiments, the methods and/or steps implemented by the transmit end device may be alternatively implemented by a component (for example, a chip or a circuit) that can be used in the transmit end device. The methods and/or steps implemented by the receive end device may be alternatively implemented by a component (for example, a chip or a circuit) that can be used in the receive end device.

Corresponding to the method provided in the foregoing method embodiments, an embodiment of this application further provides a corresponding apparatus. The apparatus includes a corresponding module configured to perform the foregoing embodiments. The module may be software, hardware, or a combination of software and hardware.

Figure 30:
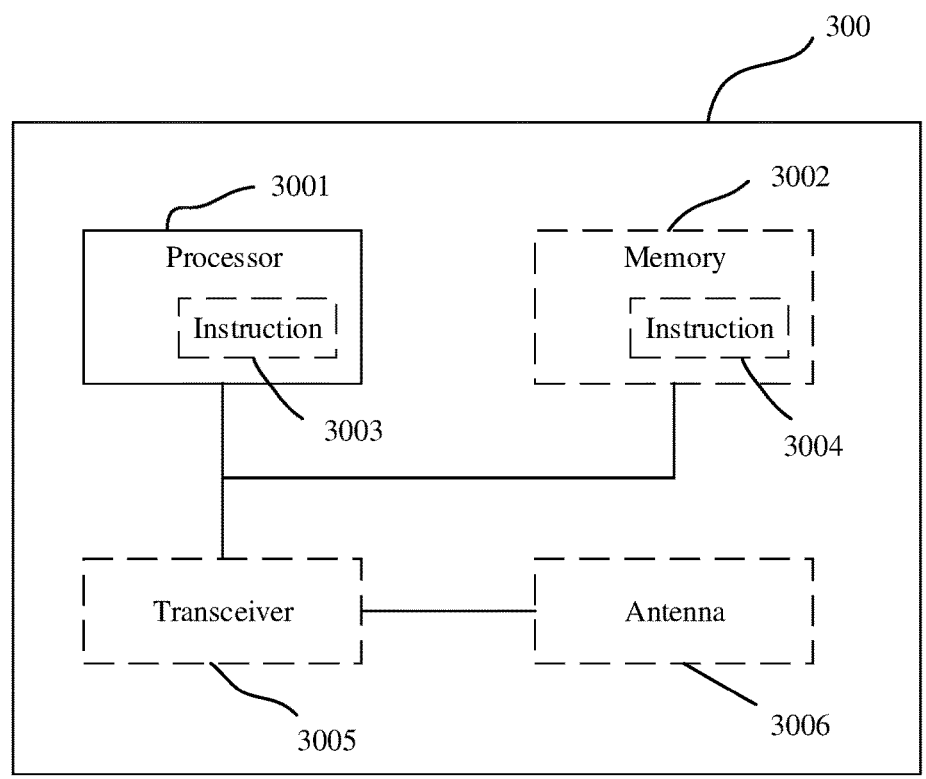
FIG. 30 is a schematic diagram of a structure of an apparatus according to an embodiment of this application.

FIG. 30 is a schematic diagram of a structure of an apparatus. The apparatus 300 may be a terminal, or may be a chip, a chip system, a processor, or the like that supports the terminal in implementing the foregoing method. Alternatively, the apparatus 300 may be a network device, or may be a chip, a chip system, a processor, or the like that supports the network device in implementing the foregoing method.

The apparatus 300 may be configured to implement the method described in the foregoing method embodiments. For details, refer to the descriptions in the foregoing method embodiments.

The apparatus 300 may include one or more processors 3001. The processor 3001 may also be referred to as a processing unit, and can implement a specific control function. The processor 3001 may be a general-purpose processor, a dedicated processor, or the like. For example, the processor 3001 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 3001 may alternatively store instructions 3003, and the instructions 3003 may be run by the processor, so that the apparatus 300 performs the method described in the foregoing method embodiments.

In another optional design, the processor 3001 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, the apparatus 300 may include a circuit, and the circuit may implement the sending, receiving, or communication function in the foregoing method embodiments.

Optionally, the apparatus 300 may include one or more memories 3002. The memory may store instructions 3004, and the instructions may be run on the processor, so that the apparatus 300 performs the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 300 may further include a transceiver 3005 and/or an antenna 3006. The processor 3001 may be referred to as a processing unit, and controls the apparatus 300. The transceiver 3005 may be referred to as a transceiver unit, a transceiver machine, a transceiver circuit, a transceiver apparatus, a transceiver module, or the like, and is configured to implement sending and receiving functions.

Optionally, the apparatus 300 in this embodiment of this application may be configured to perform the method described in FIG. 5 in embodiments of this application.

The processor and the transceiver that are described in this application may be implemented on an integrated circuit IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon-germanium (SiGe), and gallium arsenide (GaAs).

The apparatus described in the foregoing embodiments may be a transmit end device (for example, a network device or a terminal). However, a scope of the apparatus described in this application is not limited thereto, and a structure of the apparatus may not be limited by FIG. 30. The apparatus may be an independent device, or may be a part of a larger device. For example, the apparatus may be:

(1) an independent integrated circuit IC, a chip, or a chip system or subsystem;
(2) a set of one or more ICs, where optionally, the IC set may further include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or
(6) another device, or the like.

Figure 31:
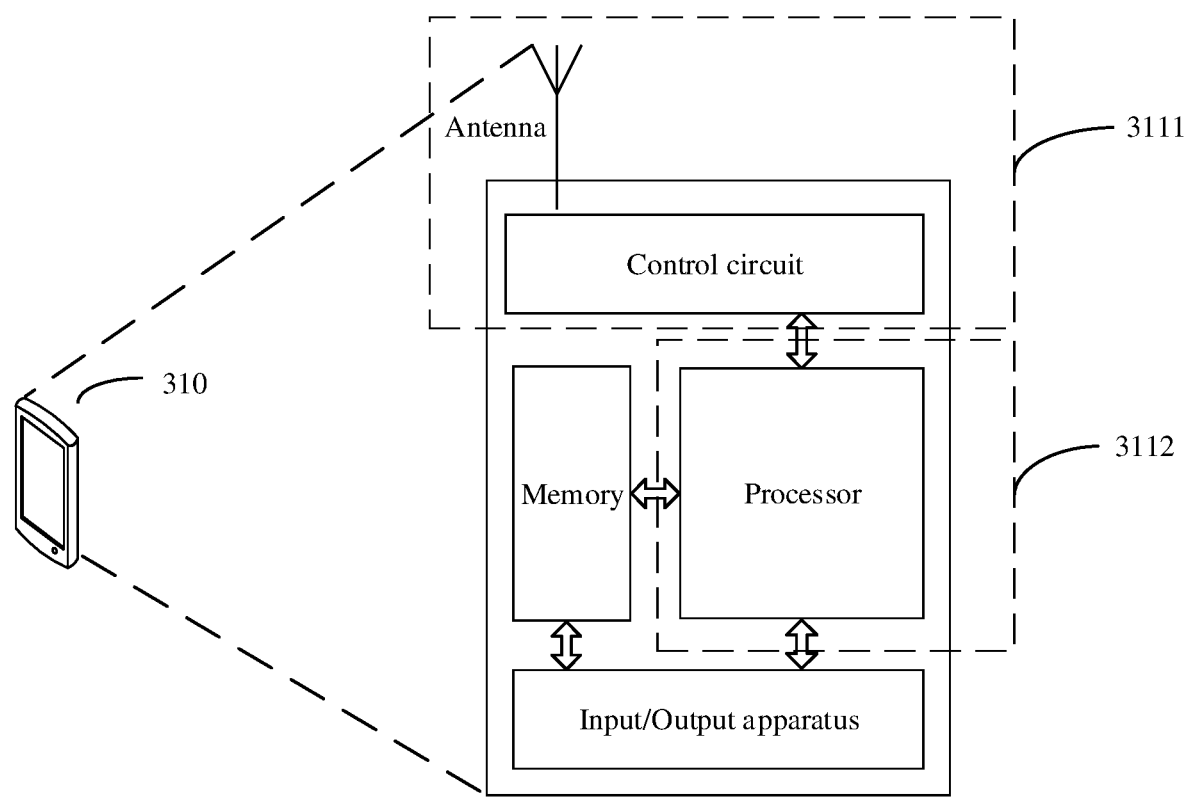
FIG. 31 is a schematic diagram of a structure of a terminal according to an embodiment of this application.

FIG. 31 is a schematic diagram of a structure of a terminal. The terminal is applicable to the scenarios shown in FIG. 2a to FIG. 3. For ease of description, FIG. 31 shows only main components of the terminal. As shown in FIG. 31, the terminal 310 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to perform conversion between a baseband signal and a radio frequency signal, and process the radio frequency signal. The antenna is mainly configured to receive and send the radio frequency signal in a form of an electromagnetic wave. The input/output apparatus, for example, a touchscreen, a display, or a keyboard, is mainly configured to: receive data input by a user and output data to the user.

After the terminal is powered on, the processor may read a software program in a storage unit, interpret and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and the radio frequency circuit sends the radio frequency signal in a form of an electromagnetic wave through the antenna. When data is sent to the terminal, the radio frequency circuit receives the radio frequency signal through the antenna, further converts the radio frequency signal into a baseband signal, and outputs the baseband signal to the processor. The processor converts the baseband signal into data, and processes the data.

For ease of description, FIG. 31 shows only one memory and one processor. Actually, the terminal may have a plurality of processors and a plurality of memories. The memory may also be referred to as a storage medium, a storage device, or the like. This is not limited in embodiments of this application.

In an optional implementation, the processor may include a baseband processor and a central processing unit. The baseband processor is mainly configured to process a communication protocol and communication data. The central processing unit is mainly configured to: control the entire terminal, execute the software program, and process the data of the software program. The processor in FIG. 31 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal may include a plurality of baseband processors to adapt to different network standards, and the terminal may include a plurality of central processing units to enhance a processing capability of the terminal. Each component of the terminal may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of the software program. The processor executes the software program, to implement a baseband processing function.

In an example, the antenna and the control circuit that have a sending/receiving function may be considered as a transceiver unit 3111 of the terminal 310, and the processor having a processing function may be considered as a processing unit 3112 of the terminal 310. As shown in FIG. 31, the terminal 310 includes the transceiver unit 3111 and the processing unit 3112. The transceiver unit may also be referred to as a transceiver, a transceiver machine, a transceiver apparatus, or the like. Optionally, a component that is in the transceiver unit 3111 and that is configured to implement a receiving function may be considered as a receiving unit, and a component that is in the transceiver unit 3111 and that is configured to implement a sending function may be considered as a sending unit. That is, the transceiver unit 3111 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like. Optionally, the receiving unit and the sending unit may be one integrated unit, or may be a plurality of independent units. The receiving unit and the sending unit may be in one geographical location, or may be distributed in a plurality of geographical locations.

Figure 32:
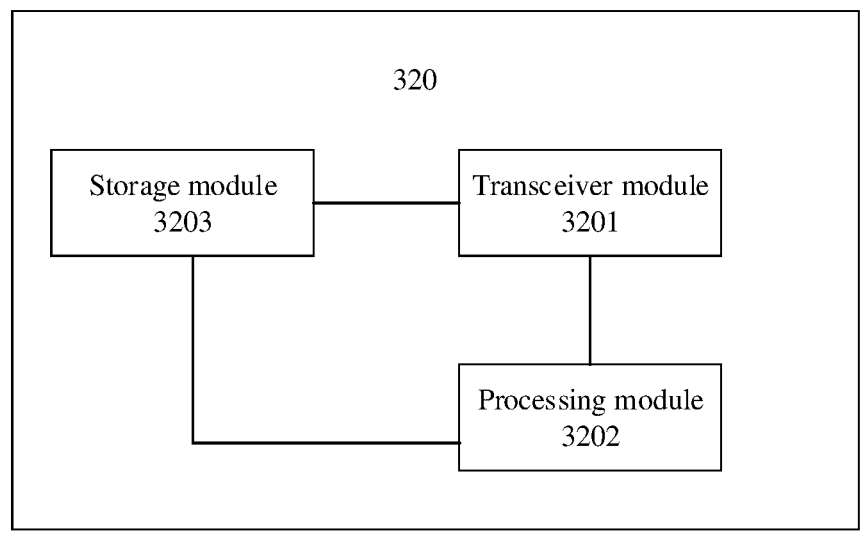
FIG. 32 is a schematic diagram of a structure of another apparatus according to an embodiment of this application.

As shown in FIG. 32, another embodiment of this application provides an apparatus 320. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the method in the method embodiments of this application. The apparatus 320 may include a processing module 3202 (or referred to as a processing unit). Optionally, the apparatus 320 may further include a transceiver module 3201 (or referred to as a transceiver unit) and a storage module 3203 (or referred to as a storage unit).

In a possible design, one or more modules in FIG. 32 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be disposed separately, or may be integrated.

The apparatus has a function of implementing the transmit end device described in embodiments of this application. For example, the apparatus includes a corresponding module, unit, or means used by the transmit end device to perform the steps related to the transmit end device and described in embodiments of this application. The function, the unit, or the means may be implemented by software or hardware, may be implemented by hardware executing corresponding software, or may be implemented by a combination of software and hardware.

Optionally, the modules in the apparatus 320 in this embodiment of this application may be configured to perform the method described in FIG. 5 in embodiments of this application.

In a possible implementation, the apparatus 320 may include the processing module 3202 and the transceiver module 3201.

In a possible design, the processing module 3202 is configured to generate a PDU based on a reference size and K network coded packets.

The processing module 3202 is further configured to generate a TB based on the PDU.

The transceiver module 3201 is configured to output the TB.

In this embodiment of this application, a transmit end device (for example, the apparatus 320) may generate the TB based on a size of a reference TB or a reference PDU, so that the TB can include an integer quantity of network coded packets. This reduces cases in which some bits of a network coded packet are correctly transmitted but decoding cannot be performed by using the bits because a coding coefficient of the network coded packet is not determined, and improves spectral efficiency.

In a possible design, the processing module 3202 is specifically configured to obtain the K network coded packets based on the reference size, and generate the PDU based on the K network coded packets.

In this embodiment of this application, the transmit end device (for example, the apparatus 320) may flexibly obtain the integer quantity of network coded packets based on the size of the reference TB or the reference PDU, so that data processing flexibility can be improved.

In a possible design, the processing module 3202 is further specifically configured to segment the last network coded packet in the K network coded packets to obtain a plurality of network coded packet segments, and generate the PDU based on the first K−1 network coded packets and a first network coded packet segment in the K network coded packets. The first network coded packet segment includes header information of the last network coded packet. The first network coded packet segment includes the first N network coded packet segments in the plurality of network coded packet segments, where N is a positive integer.

In this embodiment of this application, the transmit end device (for example, the apparatus 320) may include, in the first network coded packet segment, header information of a network coded packet to which the first network coded packet segment belongs. Therefore, the PDU generated by the transmit end device (for example, the apparatus 320) based on the first K−1 network coded packets and the first network coded packet segment includes the header information of the network coded packet to which the first network coded packet segment belongs, so that a receive end device can perform, based on the header information, decoding by using the first network coded packet segment. Therefore, spectral efficiency is improved.

In a possible design, header information of a first network coded packet includes information used to indicate a coding coefficient of the last network coded packet. The first network coded packet is a network coded packet in the first K−1 network coded packets.

In this embodiment of this application, the transmit end device (for example, the apparatus 320) may include, in the header information of the first network coded packet, the information used to indicate the coding coefficient of the last network coded packet. When the first network coded packet is correctly transmitted, the receive end device can perform, based on the information used to indicate the coding coefficient of the last network coded packet, decoding by using a network coded packet segment other than the first network coded packet segment in the plurality of network coded packet segments. Therefore, spectral efficiency is improved.

In a possible design, the processing module 3202 is further configured to add segment header information of a second network coded packet segment. The second network coded packet segment is a network coded packet segment other than the first network coded packet segment in the plurality of network coded packet segments. The segment header information includes the information used to indicate the coding coefficient of the last network coded packet.

In this embodiment of this application, the transmit end device (for example, the apparatus 320) may add the segment header information of the second network coded packet segment. When the second network coded packet segment is correctly transmitted in subsequent transmission, the receive end device can perform, based on the segment header information of the second network coded packet segment, decoding by using the second network coded packet segment. Therefore, spectral efficiency is improved.

In a possible design, the segment header information further includes information used to indicate an identifier of a network coded block to which the last network coded packet belongs.

In this embodiment of this application, the transmit end device (for example, the apparatus 320) may include, in the segment header information, the information of the identifier of the network coded block to which the last network coded packet belongs, so that the receive end device stores the network coded packet/segment based on the identifier of the network coded block, to facilitate subsequent decoding and reduce a processing delay.

In a possible design, the transceiver module 3201 is further configured to receive a request message. The request information is used to request first header information. The first header information includes header information of a second network coded packet and/or segment header information of a third network coded packet segment. The second network coded packet is a network coded packet in the K network coded packets. The third network coded packet segment is a segment of the last network coded packet in the K network coded packets. The transceiver module 3201 is further configured to send, based on the request information, information used to indicate the first header information.

In this embodiment of this application, when header information of a network coded packet or segment header information of a network coded packet segment is not correctly transmitted, the transmit end device (for example, the apparatus 320) retransmits the header information or the segment header information, without retransmitting a data part of the network coded packet or the network coded packet segment, to reduce resource overheads.

In a possible design, a total size of the first K−1 network coded packets in the K network coded packets is less than the reference size, and a total size of the K network coded packets is greater than or equal to the reference size.

In this embodiment of this application, because the total size of the K network coded packets used to generate the PDU is greater than or equal to the reference size, a size of the PDU generated by the transmit end device (for example, the apparatus 320) may be greater than the size of the reference PDU, so that a code rate can be increased.

In a possible design, the total size of the K network coded packets is less than or equal to the reference size, and a total size of the K network coded packets and a third network coded packet is greater than the reference size. The third network coded packet is a network coded packet other than the K network coded packets.

In this embodiment of this application, because the total size of the K network coded packets used to generate the PDU is less than or equal to the reference size, the size of the PDU generated by the transmit end device (for example, the apparatus 320) may be less than the size of the reference PDU, so that the code rate can be reduced.

In a possible design, a size of the TB is different from the size of the reference TB.

In this embodiment of this application, because the size of the actually generated TB may be different from the size of the reference TB, the transmit end device (for example, the apparatus 320) does not need to generate the TB based on the size of the reference TB, so that data processing flexibility can be improved.

In a possible design, the size of the PDU is different from the size of the reference PDU.

In this embodiment of this application, because the size of the actually generated PDU may be different from the size of the reference PDU, the transmit end device (for example, the apparatus 320) does not need to generate the PDU based on the size of the reference PDU, so that data processing flexibility can be improved.

In a possible design, the PDU is one of the following PDUs: a media access control MAC layer PDU, a radio link control RLC layer PDU, a backhaul adaptation protocol BAP layer PDU, a packet data convergence protocol PDCP layer PDU, or a PDU of a protocol layer having a network coding function.

In a possible design, the processing module 3202 is further configured to determine, based on a PDU of a second protocol layer and with reference to a network coding parameter and/or a preset rule, a plurality of original data units included in a network coded block. The network coding parameter may include a size of the original data unit included in the network coded block and/or a quantity of original data units included in the network coded block. The preset rule may include: One PDU of the second protocol layer is used as one original data unit; or P PDUs of the second protocol layer are used as M original data units, where P is a positive integer, and M is a positive integer greater than or equal to 2.

In a possible design, the processing module 3202 is specifically configured to: use a $k^{th}$ network coded packet in the K network coded packets as a $k^{th}$ PDU, where header information of the $k^{th}$ network coded packet is used as a protocol header of the $k^{th}$ PDU, and k is a positive integer from 1 to K; or use a $k^{th}$ network coded packet in the K network coded packets as a payload of a $k^{th}$ PDU, and add a protocol header of the $k^{th}$ PDU.

In a possible design, the processing module 3202 is specifically configured to concatenate the K network coded packets to obtain the PDU. The PDU includes at least K protocol subheaders. The header information of the $k^{th}$ network coded packet in the K network coded packets is located in a $k^{th}$ protocol subheader of the PDU, where k is a positive integer from 1 to K. The first field after the $k^{th}$ protocol subheader of the PDU is padded with a network coded unit of the $k^{th}$ network coded packet. Alternatively, the K protocol subheaders of the PDU are sequentially arranged to form a protocol header of the PDU. Alternatively, the K protocol subheaders of the PDU are sequentially arranged, and the PDU further includes a $(K+1)^{th}$ protocol subheader. Information in the (K+1)th protocol subheader is used to indicate one or more of the following: a quantity of network coded units included in the PDU, a size of the PDU, and a size of a field other than the protocol header in the PDU.

In a possible implementation, the processing module 3202 is specifically configured to concatenate the K network coded packets to obtain the PDU. The K network coded packets are used as payloads of the PDU. The PDU includes the protocol header.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions.

A person skilled in the art may further understand that various illustrative logical blocks and steps that are listed in embodiments of this application may be implemented by using electronic hardware, computer software, or a combination thereof. Whether the functions are implemented by hardware or software depends on a particular application and a design requirement of the entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logical device, a discrete gate or transistor logic device, or a discrete hardware component.

The solutions described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that, in embodiments of this application, the memory may be a transitory memory or a non-transitory memory, or may include both a transitory memory and a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM) and is used as an external cache. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory in the system and the method described in this specification is intended to include, but not limited to, these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments by using any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a position in this application are only used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural. The character "/" generally indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It may be understood that, in embodiments of this application, "B corresponding to A" should indicate that B is associated with A, and B may be determined based on A. However, it should be further understood that determining B based on A does not mean that B is determined based only on A. B may alternatively be determined based on A and/or other information.

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each specific application, but it should not be considered that the implementation goes beyond the scope of this application.

A person of ordinary skill in the art may understand that, for a purpose of convenient and brief descriptions, for a detailed working process of the foregoing system, apparatus, and unit, refer to a corresponding process in the foregoing method embodiments.

It may be understood that the system, apparatus, and method described in this application may alternatively be implemented in another manner. For example, the described apparatus embodiment is only an example. For example, division into the units is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing descriptions are implementations of this application, but are not intended to limit the protection scope of this application.

The foregoing descriptions are only specific implementations of this application, but are not intended to limit the protection scope of this application. Any variation or replacement readily figured out by a person skilled in the art within the technical scope disclosed in this application shall fall within the protection scope of this application.

What is claimed is:

1. A communication method comprising:
 generating a protocol data unit (PDU) based on a reference size and K network coded packets, wherein K is a positive integer, the reference size is a size of a reference transport block (TB) or a size of a reference PDU, and the generating a PDU based on a reference size and K network coded packets comprises:
  obtaining the K network coded packets based on the reference size;
  segmenting the last network coded packet in the K network coded packets to obtain a plurality of network coded packet segments, wherein a first network coded packet segment of the plurality of network coded packet segments comprises header information of the last network coded packet, the first network coded packet segment comprises the first N network coded packet segments in the plurality of network coded packet segments, and N is a positive integer; and generating the PDU based on the first K−1 network coded packets in the K network coded packets and the first network coded packet segment;
generating a TB based on the PDU; and
outputting the TB.

2. The method according to claim 1, wherein the method further comprises:
receiving request information, wherein the request information indicates a request for first header information, the first header information comprises header information of a second network coded packet and/or segment header information of a third network coded packet segment, the second network coded packet is a network coded packet in the K network coded packets, and the third network coded packet segment is a segment of the last network coded packet in the K network coded packets; and
sending, based on the request information, information indicating the first header information.

3. The method according to claim 1, wherein a total size of the first K−1 network coded packets in the K network coded packets is less than the reference size, and a total size of the K network coded packets is greater than or equal to the reference size.

4. The method according to claim 1, wherein header information of a first network coded packet comprises information that indicates a coding coefficient of the last network coded packet, and the first network coded packet is a network coded packet in the first K−1 network coded packets.

5. The method according to claim 1, wherein the method further comprises:
adding segment header information of a second network coded packet segment, wherein the second network coded packet segment is a network coded packet segment other than the first network coded packet segment in the plurality of network coded packet segments, and the segment header information comprises the information that indicates the coding coefficient of the last network coded packet.

6. A non-transitory computer readable storage medium, wherein the non-transitory computer readable medium stores instructions that are executable by a computer, and the instructions when executed by the computer, cause the computer to perform operations comprising:
generating a protocol data unit (PDU) based on a reference size and K network coded packets, wherein K is a positive integer, the reference size is a size of a reference transport block (TB) or a size of a reference PDU, and the generating a PDU based on a reference size and K network coded packets comprises:
obtaining the K network coded packets based on the reference size;
segmenting the last network coded packet in the K network coded packets to obtain a plurality of network coded packet segments, wherein a first network coded packet segment of the plurality of network coded packet segments comprises header information of the last network coded packet, the first network coded packet segment comprises the first N network coded packet segments in the plurality of network coded packet segments, and N is a positive integer; and
generating the PDU based on the first K−1 network coded packets in the K network coded packets and the first network coded packet segment;
generating a TB based on the PDU; and
outputting the TB.

7. The non-transitory computer readable storage medium according to claim 6, wherein header information of a first network coded packet comprises information indicating a coding coefficient of the last network coded packet, and the first network coded packet is a network coded packet in the first K−1 network coded packets.

8. The non-transitory computer readable storage medium according to claim 6, the instructions further comprise instructions for:
adding segment header information of a second network coded packet segment, wherein the second network coded packet segment is a network coded packet segment other than the first network coded packet segment in the plurality of network coded packet segments, and the segment header information comprises the information that indicates the coding coefficient of the last network coded packet.

9. The non-transitory computer readable storage medium according to claim 6, wherein a total size of the first K−1 network coded packets in the K network coded packets is less than the reference size, and a total size of the K network coded packets is greater than or equal to the reference size.

10. An apparatus, comprising:
one or more processors; and
a memory having instructions stored thereon that, when executed by the one or more processors, cause the apparatus to perform operations comprising:
generating a protocol data unit (PDU) based on a reference size and K network coded packets, wherein K is a positive integer, the reference size is a size of a reference transport block (TB) or a size of a reference PDU, and the generating a PDU based on a reference size and K network coded packets comprises:
obtaining the K network coded packets based on the reference size;
segmenting the last network coded packet in the K network coded packets to obtain a plurality of network coded packet segments, wherein a first network coded packet segment comprises header information of the last network coded packet, the first network coded packet segment comprises the first N network coded packet segments in the plurality of network coded packet segments, and N is a positive integer; and
generating the PDU based on the first K−1 network coded packets in the K network coded packets and the first network coded packet segment;
generating a TB based on the PDU; and
outputting the TB.

11. The apparatus according to claim 10, wherein header information of a first network coded packet comprises information used to indicate a coding coefficient of the last network coded packet, and the first network coded packet is a network coded packet in the first K−1 network coded packets.

12. The apparatus according to claim 10, wherein the apparatus is further caused to:
add segment header information of a second network coded packet segment, wherein the second network coded packet segment is a network coded packet segment other than the first network coded packet segment in the plurality of network coded packet segments, and the segment header information comprises the information that indicates the coding coefficient of the last network coded packet.

13. The apparatus according to claim 10, wherein the apparatus is further caused to:
- receive request information, wherein the request information indicates a request for first header information, the first header information comprises header information of a second network coded packet and/or segment header information of a third network coded packet segment, the second network coded packet is a network coded packet in the K network coded packets, and the third network coded packet segment is a segment of the last network coded packet in the K network coded packets; and
- send, based on the request information, information indicating the first header information.

14. The apparatus according to claim 10, wherein a total size of the first K−1 network coded packets in the K network coded packets is less than the reference size, and a total size of the K network coded packets is greater than or equal to the reference size.

\* \* \* \* \*